US010412018B1

United States Patent
Feng et al.

(10) Patent No.: US 10,412,018 B1
(45) Date of Patent: Sep. 10, 2019

(54) HIERARCHICAL QUEUE SCHEDULER

(71) Applicant: Barefoot Networks, Inc., Santa Clara, CA (US)

(72) Inventors: Michael Feng, Mountain View, CA (US); Anurag Agrawal, Santa Clara, CA (US); Yi Li, Fremont, CA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 0 days.

(21) Appl. No.: 15/682,479

(22) Filed: Aug. 21, 2017

Related U.S. Application Data

(60) Provisional application No. 62/474,594, filed on Mar. 21, 2017, provisional application No. 62/485,145, filed on Apr. 13, 2017.

(51) Int. Cl.
| | | |
|---|---|---|
| *H04L 12/28* | (2006.01) | |
| *H04L 12/869* | (2013.01) | |
| *H04L 12/861* | (2013.01) | |
| *H04L 12/935* | (2013.01) | |

(52) U.S. Cl.
CPC .......... *H04L 47/60* (2013.01); *H04L 49/3036* (2013.01); *H04L 49/3063* (2013.01); *H04L 49/9057* (2013.01)

(58) Field of Classification Search
CPC ... H04L 12/56; H04L 12/569; H04L 12/5693; H04L 12/5694; H04L 12/5696
USPC ........ 370/389, 392, 400, 412, 413, 428, 429
See application file for complete search history.

(56) References Cited

U.S. PATENT DOCUMENTS

| | | | |
|---|---|---|---|
| 6,442,172 B1 | 8/2002 | Wallner et al. | |
| 6,480,911 B1 | 11/2002 | Lu | |
| 6,876,668 B1* | 4/2005 | Chawla | ................... H04L 47/52 370/230 |
| 7,418,523 B2* | 8/2008 | Pettyjohn | ................ H04L 47/22 370/235 |

(Continued)

FOREIGN PATENT DOCUMENTS

EP    3229424 A1    10/2017

OTHER PUBLICATIONS

Alizadeh, Mohammad, et al., "pFabric: Minimal Near-Optimal Datacenter Transport," SIGCOMM'13, Aug. 12-16, 2013, 12 pages, ACM, Hong Kong, China.

(Continued)

*Primary Examiner* — Dmitry Levitan
(74) *Attorney, Agent, or Firm* — Adeli LLP

(57) ABSTRACT

Some embodiments provide a method for scheduling a packet to be dequeued to a processing pipeline of a hardware forwarding element. The method selects a node representing one of multiple ports associated with the processing pipeline. For each of one or more layers of logical queues, the method (i) identifies a set of logical queue nodes associated with a previously selected node based on a configuration that maps multiple physical queues to the multiple ports via the one or more layers of logical queues and (ii) selects one of the identified logical queue nodes based on properties of the identified logical queue nodes. The method selects one of a set of physical queues associated with a selected logical queue node of the last layer of logical queues. The method dequeues a next packet from the selected physical queue for processing by the processing pipeline.

20 Claims, 15 Drawing Sheets

(56) References Cited

U.S. PATENT DOCUMENTS

| | | | |
|---|---|---|---|
| 7,826,371 B2* | 11/2010 | Hirayama | H04L 47/10 370/236.1 |
| 7,916,638 B2 | 3/2011 | Lim et al. | |
| 8,077,611 B2 | 12/2011 | Bettink et al. | |
| 8,254,403 B2* | 8/2012 | Hashimoto | H04L 47/10 370/230 |
| 8,615,013 B2* | 12/2013 | Sonnier | H04L 47/621 370/395.4 |
| 8,619,787 B2* | 12/2013 | Sonnier | H04L 47/621 370/395.4 |
| 9,112,818 B1 | 8/2015 | Arad et al. | |
| 9,148,368 B2* | 9/2015 | Armstrong | H04L 45/44 |
| 9,686,209 B1 | 6/2017 | Arad et al. | |
| 10,015,076 B2* | 7/2018 | Kanayama | H04L 41/0813 |
| 10,044,646 B1 | 8/2018 | Detwiler | |
| 2002/0141403 A1 | 10/2002 | Akahane et al. | |
| 2003/0046414 A1 | 3/2003 | Pettyjohn et al. | |
| 2004/0042477 A1 | 3/2004 | Bitar et al. | |
| 2004/0105384 A1 | 6/2004 | Gallezot et al. | |
| 2004/0165588 A1 | 8/2004 | Pandya | |
| 2004/0179476 A1 | 9/2004 | Kim et al. | |
| 2005/0013251 A1 | 1/2005 | Wang et al. | |
| 2005/0078651 A1 | 4/2005 | Lee et al. | |
| 2005/0243852 A1 | 11/2005 | Bitar et al. | |
| 2006/0050690 A1 | 3/2006 | Epps et al. | |
| 2007/0008985 A1 | 1/2007 | Lakshmanamurthy et al. | |
| 2007/0104102 A1 | 5/2007 | Opsasnick | |
| 2007/0104211 A1 | 5/2007 | Opsasnick | |
| 2007/0110090 A1 | 5/2007 | Musoll et al. | |
| 2007/0189169 A1 | 8/2007 | Wu et al. | |
| 2007/0195761 A1 | 8/2007 | Tatar et al. | |
| 2007/0195773 A1 | 8/2007 | Tatar et al. | |
| 2007/0208876 A1 | 9/2007 | Davis | |
| 2007/0230493 A1 | 10/2007 | Dravida et al. | |
| 2007/0253438 A1 | 11/2007 | Curry et al. | |
| 2008/0130670 A1 | 6/2008 | Kim et al. | |
| 2008/0232251 A1 | 9/2008 | Hirayama et al. | |
| 2008/0247409 A1 | 10/2008 | Choudhury et al. | |
| 2009/0180475 A1 | 7/2009 | Hashimoto | |
| 2010/0128735 A1 | 5/2010 | Lipschutz | |
| 2013/0003556 A1 | 1/2013 | Boden et al. | |
| 2013/0315054 A1 | 11/2013 | Shamis et al. | |
| 2014/0112128 A1 | 4/2014 | Kwan et al. | |
| 2014/0328180 A1 | 11/2014 | Kim et al. | |
| 2014/0334489 A1 | 11/2014 | Bosshart et al. | |
| 2015/0016266 A1 | 1/2015 | Dumitrescu et al. | |
| 2015/0138976 A1 | 5/2015 | Lu et al. | |
| 2015/0139235 A1 | 5/2015 | Lu et al. | |
| 2015/0229575 A1 | 8/2015 | Bottorff et al. | |
| 2016/0154756 A1 | 6/2016 | Dodson et al. | |
| 2016/0173383 A1 | 6/2016 | Liu et al. | |
| 2016/0330127 A1 | 11/2016 | Kim et al. | |
| 2016/0330128 A1 | 11/2016 | Wang | |
| 2017/0012855 A1 | 1/2017 | Kanayama et al. | |
| 2017/0126588 A1 | 5/2017 | Anand et al. | |
| 2017/0134282 A1 | 5/2017 | Agarwal et al. | |
| 2017/0134310 A1 | 5/2017 | Koladi et al. | |
| 2017/0222881 A1 | 8/2017 | Holbrook et al. | |
| 2017/0264571 A1 | 9/2017 | Aibester et al. | |
| 2018/0006945 A1 | 1/2018 | Flajslik et al. | |

OTHER PUBLICATIONS

Bosshart, Patrick, et al., "Forwarding Metamorphosis: Fast Programmable Match-Action Processing in Hardware for SDN," SIGCOMM'13, Aug. 12-16, 2013,12 pages, ACM, Hong Kong, China.

Choudhury, Abhijit K., et al., "Dynamic Queue Length Thresholds for Shared-Memory Packet Switches," IEEE/ACM Transactions on Networking, Apr. 1998, 29 pages, vol. 6, No. 2.

Alizadeh, Mohammad, et al., "CONGA: Distributed Congestion-Aware Load Balancing for Datacenters," SIGCOMM'14, Aug. 17-22, 2014, 12 pages, ACM, Chicago, IL, USA, Retrieved From: https://people.csail.mit.edu/alizadeh/papers/conga-sigcomm14.pdf.

Jeyakumar, Vimalkumar, et al., "Millions of Lithe Minions: Using Packets for Low Latency Network Programming and Visibility," SIGCOMM'14, Aug. 17-22, 2014, 12 pages, ACM, Chicago, IL, USA.

Sivaraman, Anirudh, et al., "Towards Programmable Packet Scheduling," HotNets '15, Nov. 16-17, 2015, 7 pages, ACM, Philadelphia, PA, USA.

Non-Published Commonly Owned U.S. Appl. No. 15/374,828, filed Dec. 9, 2016, 40 pages, Barefoot Networks, Inc.

Non-Published Commonly Owned U.S. Appl. No. 15/374,820, filed Dec. 9, 2016, 40 pages, Barefoot Networks, Inc.

Non-Published Commonly Owned U.S. Appl. No. 15/682,481, filed Aug. 21, 2017, 59 pages, Barefoot Networks, Inc.

Author Unknown, "IEEE P802.1p," https://en.wikipedia.org/wiki/IEEE_P802.1 p, Mar. 6, 2018, 2 pages, Wikipedia.

Wadekar, Manoj, "Priority-based Flow Control and 802.3x," Feb. 11, 2008, 4 pages, Institute of Electrical and Eectronics Engineers, Inc.

* cited by examiner

HIERARCHICAL QUEUE SCHEDULER

BACKGROUND

Network schedulers operate on forwarding elements to manage the sequence in which packets are released from a queue. Typically, a forwarding element (switch, router, etc.) will have multiple queues on the receive and/or send sides, with each queue having one or more data flows assigned. The scheduler is responsible for ordering the release of packets from these different queues, often using predefined algorithms. However, as network conditions may change, it would be desirable to be able to modify the scheduler operation on the fly, without requiring control plane intervention to do so.

BRIEF SUMMARY

Some embodiments of the invention provide a forwarding element with multi-stage packet processing pipelines that can store instructions with packet data to modify queues of the forwarding element. Based on data in a packet header or otherwise associated with a packet, stored in a stateful memory, etc., one of the stages of a processing pipeline makes a determination that a setting of one of the forwarding element queues should be modified, and stores instructions to modify the queue setting (e.g., as well as an identifier of the queue to be modified) along with the packet data. This stored information is subsequently used by the forwarding element (e.g., a different unit of the forwarding element) to modify the setting of the specified queue.

The forwarding element, in some embodiments, is a hardware forwarding element with a set of configurable ingress pipelines (e.g., multi-stage match-action pipelines), a traffic management unit, and a set of configurable egress pipelines (e.g., multi-stage match-action pipelines). The traffic management unit of some embodiments receives packets processed by the ingress pipelines, determines an egress pipeline for each packet, and stores the packet data (e.g., in a buffer) before the egress pipeline processes the packet. When adding the packet data to the buffer, some embodiments add a reference (e.g., a pointer) to the packet data in a queue for the determined egress pipeline. Each egress pipeline (which, in some embodiments, corresponds to a set of one or more ports of the forwarding element) has multiple queues in some embodiments, and a scheduler of the traffic management unit is responsible for scheduling the dequeuing of packets from these queues. In addition, the scheduler is hierarchically arranged in some embodiments, with multiple layers of (physical or logical) queues. In some embodiments, the queue modification instructions modify the scheduler settings for a particular physical or logical queue.

In some embodiments, the multi-stage processing pipeline that stores the queue modification instructions with a packet may be either one of the ingress pipelines or one of the egress pipelines. As mentioned, each of the egress pipelines is associated with one or more ports of the forwarding element in some embodiments. Similarly, each of the ingress pipelines is also associated with one or more of the ports. The traffic management unit has multiple queues for each egress pipeline, with each queue associated with one egress pipeline (e.g., queues 0-127 for pipeline 1, queues 0-127 for pipeline 2, etc.). In some embodiments, a given ingress pipeline can store instructions with a packet to modify any queue of any egress pipeline, even if (i) that egress pipeline is associated with a different set of ports than the ingress pipeline and/or (ii) the packet is placed in a queue associated with a different egress pipeline. Similarly, an egress pipeline in some embodiments can store instructions with a packet to modify any of the queues associated with any egress pipeline. On the other hand, in some other embodiments an egress pipeline can only store instructions with a packet to modify any of the queues associated with that egress pipeline, and not queues associated with any of the other egress pipelines.

The egress pipelines are better situated to store and analyze stateful data regarding the queue status (and for the traffic management unit to pass this data to the pipeline via data stored with a packet). The ingress pipelines, however, may receive flow control packets from other forwarding elements specifying flows or sets of flows that are causing those forwarding elements to back up, and thus can modify the queue scheduling settings for the queues to which these flows are sent. While the egress pipelines can also be configured to use these packets sent by other forwarding elements in order to modify queue scheduling settings, the ingress pipelines are better situated to perform these modifications.

In order to store the queue modification instructions with the data for a packet, in some embodiments a multi-stage packet processing pipeline adds the instructions to the packet data used by the pipeline that is passed from stage to stage. In some embodiments, each ingress and egress pipeline includes a parser, a match-action unit with a series of match-action stages, and a deparser. The parser initially receives the packet (i.e., from a physical port for an ingress pipeline, or from the traffic management unit for an egress pipeline) as a formatted sequence of bits (i.e., arranged in header fields according to specific protocols) and parses this data into the constituent header fields. These constituent header fields are arranged into a packet header vector, which is passed from stage to stage, while the remainder of the packet (i.e., the payload) or the entire packet including the header fields is sent outside of the match-action unit (e.g., directly to the deparser to be combined with the packet header vector after processing).

In some embodiments, the packet header vector is made up of a set of data containers (e.g., 32 bit containers, 24 bit containers, etc.) that can be individually manipulated. When the action unit of a particular match-action stage specifies to store queue modification instructions with a packet, some embodiments store this data in a specific container. The match-action unit stores a port identifier and queue identifier that together identify the specific queue to be manipulated, and then the actual setting modification instructions for that queue in the remainder of the container.

The deparser of the processing pipeline is responsible for rearranging the information in the payload and the packet header vector (as manipulated by the match-action stages) back into a packet. In addition, the deparser identifies specific data in the packet header vector (e.g., specific data containers) that do not actually store packet header information, and performs any necessary operations. Thus, for example, the queue setting modification instructions are not part of the actual reconstructed packet header; instead, this information is provided to the scheduler of the traffic management unit. For ingress packets, this information is sent with the packet to the traffic management unit, so that the traffic management unit can process the queue setting modification The queue modification instructions, as mentioned, modify the scheduler settings for a particular queue in some embodiments. In some embodiments, each queue is configured with a maximum scheduling rate (e.g., in either packets per second or bits per second), which is the rate at which packets can be scheduled for dequeuing from the queue. The scheduler maintains a remaining limit (referred to as a "bucket") for each queue, which can range in some embodiments from 0 to a maximum queue burst size. The scheduler adds to the bucket at the maximum scheduling rate amount (e.g., if the rate for a particular queue is 10 pps, the scheduler adds 10 packets to the remaining limit for the particular queue each second, so long as this does not exceed the maximum queue burst size). Similarly, in normal operation, the scheduler subtracts from the remaining limit for each packet scheduled for dequeuing.

In some embodiments, the queue modification instructions modify this remaining limit. For instance, the queue modification instructions may add to the bucket for a particular queue, which will allow the scheduler to dequeue packets from the particular queue more quickly. In some embodiments, this causes the scheduler algorithm to give more weight to the particular queue when selecting a queue for scheduling. The queue modification instructions may also subtract from the bucket for a particular queue, which will limit the rate at which the scheduler dequeues packets from the particular queue (and in some embodiments, causes the scheduler algorithm to give less weight to the particular queue when selecting a queue for scheduling). In some embodiments, these queue modification instructions (credits) may only increase the bucket size up to the maximum queue burst size and decrease the bucket size to 0.

Alternatively or conjunctively to the use of these queue credits, in some embodiments the queue setting modification instructions specify to turn on or off scheduling for a queue. That is, rather than adjust the bucket size, the queue modification instructions may turn off scheduling entirely for a particular queue, such that the queue will not be scheduled (and thus no packets will be dequeued from that queue). To re-initiate scheduling for a queue, the queue modification instructions can also turn scheduling back on for a queue that was previously turned off, such that the queue will be scheduled again (and packets will start being dequeued from that queue).

As mentioned, the scheduler is hierarchically arranged in some embodiments, in that it uses a configurable hierarchical mapping of physical queues to ports. In some embodiments, one or more layers of logical queues are defined between a set of physical queues associated with a pipeline (e.g., an egress pipeline) and the ports associated with that pipeline. In general, the number of queues becomes less at each subsequent layer from the physical queues to the ports (e.g., 128 physical queues, 64 second-layer logical queues, 16 first-layer logical queues, and 8 ports). A specific configuration for the hierarchical scheduler maps each physical queue to one top-layer logical queue, each top-layer logical queue to one logical queue at the next layer, and each last-layer logical queue to one port. Thus, the number of nodes decreases at each subsequent layer, at least one of the ports is mapped to multiple last-layer logical queues, at least one of the top-layer logical queues is mapped to multiple physical queues, etc.

When a packet is received by the traffic management unit, the traffic management unit of some embodiments adds the packet to a physical queue (according to packet properties, such as its source and destination addresses, etc.) and notifies the scheduler of the addition of the packet to this queue. The scheduler stores state data for each physical queue node, logical queue node, and port node in its scheduler configuration. Upon receipt of the packet, the scheduler updates the node that corresponds the queue to which the packet was added. In addition, based on the hierarchical queue configuration, the scheduler updates the state of the logical queue nodes at each logical queue layer to account for the addition of the packet, as well as the node for the corresponding port to which the physical queue of the packet maps through the logical queue layers.

When updating the logical queue nodes, some embodiments also update the priority of the logical queue nodes. In some embodiments, the configuration for the scheduler assigns a priority to each physical queue. The logical queue nodes can have priorities assigned dynamically or statically in different embodiments (or a combination thereof). A logical queue node with a static assignment has its priority assigned by the configuration, which does not change. However, other logical queue nodes may have priorities propagated from the previous layer of nodes. In some such embodiments, a logical queue node has the priority of its highest-priority queue node at the previous layer that is eligible and non-empty. Thus, if a first packet is assigned to a first queue with a first priority that maps to a particular logical queue node, that logical queue node will initially have that first priority. If a second packet is then assigned to a second queue with a second, higher priority that also maps to the particular logical queue node, at that point the logical queue node will be assigned that higher second priority. If the second packet is dequeued without any new additions to the logical queue node, the priority for the particular logical queue node will be decreased back to the first priority.

To schedule a packet for dequeuing, some embodiments proceed through the hierarchy in the opposite order of the enqueuing. That is, upon determining that a packet should be dequeued to a particular egress pipeline, some embodiments first select a port, then a lowest-layer logical queue node that maps to the selected port, then a logical queue node at the next layer, and so on, until a physical queue is selected. Some embodiments schedule a packet for dequeuing each clock cycle, while other embodiments schedule a packet in response to a message or other external indicator.

Different embodiments may use different scheduling techniques to select among a group of eligible nodes. For instance, some embodiments select a port differently than the other queue layers. In some embodiments, the eligible ports are selected using a fair, round-robin algorithm (that is, there is no notion of priority between ports). So long as a port is turned on (i.e., scheduling has not been turned off for the port), has at least one eligible logical queue that maps to it, and has not exceeded a maximum rate (though, in some embodiments, there is no maximum rate set for ports, only for physical and logical queues), the port is eligible for scheduling and will be selected in turn with the other eligible ports.

At the queue layers, some embodiments first remove all non-eligible queue nodes. A queue node is considered non-eligible if no packets are associated to the queue, if the queue has exceeded its maximum rate, or if scheduling has been turned off for the queue (e.g., based on data received from an ingress or egress match-action pipeline). In some embodiments, the queue state stored by the scheduler for each queue node includes the occupancy of the queue, its maximum rate, whether scheduling is on or has been turned off, its minimum (guaranteed) rate, its priority, its weight relative to other queues in its layer, and its current transmission rate. The minimum rate, maximum rate, and weight are based on the scheduler configuration, while the occupancy, priority (assuming a dynamic priority is used), scheduling status, and current transmission rate are updated as packets are enqueued and dequeued.

After removing the non-eligible queue nodes, some embodiments first prioritize queues that are below their guaranteed rate. If multiple queues are below their respective guaranteed rates, the scheduler of some embodiments uses a round-robin or other fair mechanism to select among these queues. In other embodiments, the highest-priority queue below its guaranteed rate is selected. If all of the eligible queue nodes are above their respective guarantees, some embodiments then select the highest-priority node. Again, if there is a tie, a round-robin or similar fair mechanism is used. Some embodiments also use the relative weights to modify the round-robin scheduling. For instance, if a first queue node has a weight of 1 and a second queue node has a weight of 2, then the second queue node will be selected twice in a single round-robin cycle while the first queue node will be selected once.

Other embodiments may use different queue node selection algorithms. For instance, some embodiments may not use guaranteed rates, or may use different selection techniques when multiple equal-priority queue nodes are available. In addition, some embodiments apply a weighted random selection mechanism between all eligible queues, with the weights based on a combination of priority, current transmission rate, maximum transmission rate, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a forwarding element with multi-stage packet processing pipelines that can store instructions with packet data to modify queues of the forwarding element. Based on data in a packet header or otherwise associated with a packet, stored in a stateful memory, etc., one of the stages of a processing pipeline makes a determination that a setting of one of the forwarding element queues should be modified, and stores instructions to modify the queue setting (e.g., as well as an identifier of the queue to be modified) along with the packet data. This stored information is subsequently used by the forwarding element (e.g., a different unit of the forwarding element) to modify the setting of the specified queue.

The forwarding element, in some embodiments, is a hardware forwarding element with a set of configurable ingress pipelines (e.g., multi-stage match-action pipelines), a traffic management unit, and a set of configurable egress pipelines (e.g., multi-stage match-action pipelines). The traffic management unit of some embodiments receives packets processed by the ingress pipelines, determines an egress pipeline for each packet, and stores the packet data (e.g., in a buffer) before the egress pipeline processes the packet. When adding the packet data to the buffer, some embodiments add a reference (e.g., a pointer) to the packet data in a queue for the determined egress pipeline. Each egress pipeline (which, in some embodiments, corresponds to a set of one or more ports of the forwarding element) has multiple queues in some embodiments, and a scheduler of the traffic management unit is responsible for scheduling the dequeuing of packets from these queues. In addition, the scheduler is hierarchically arranged in some embodiments, with multiple layers of (physical or logical) queues. In some embodiments, the queue modification instructions modify the scheduler settings for a particular physical or logical queue.

Figure 1:
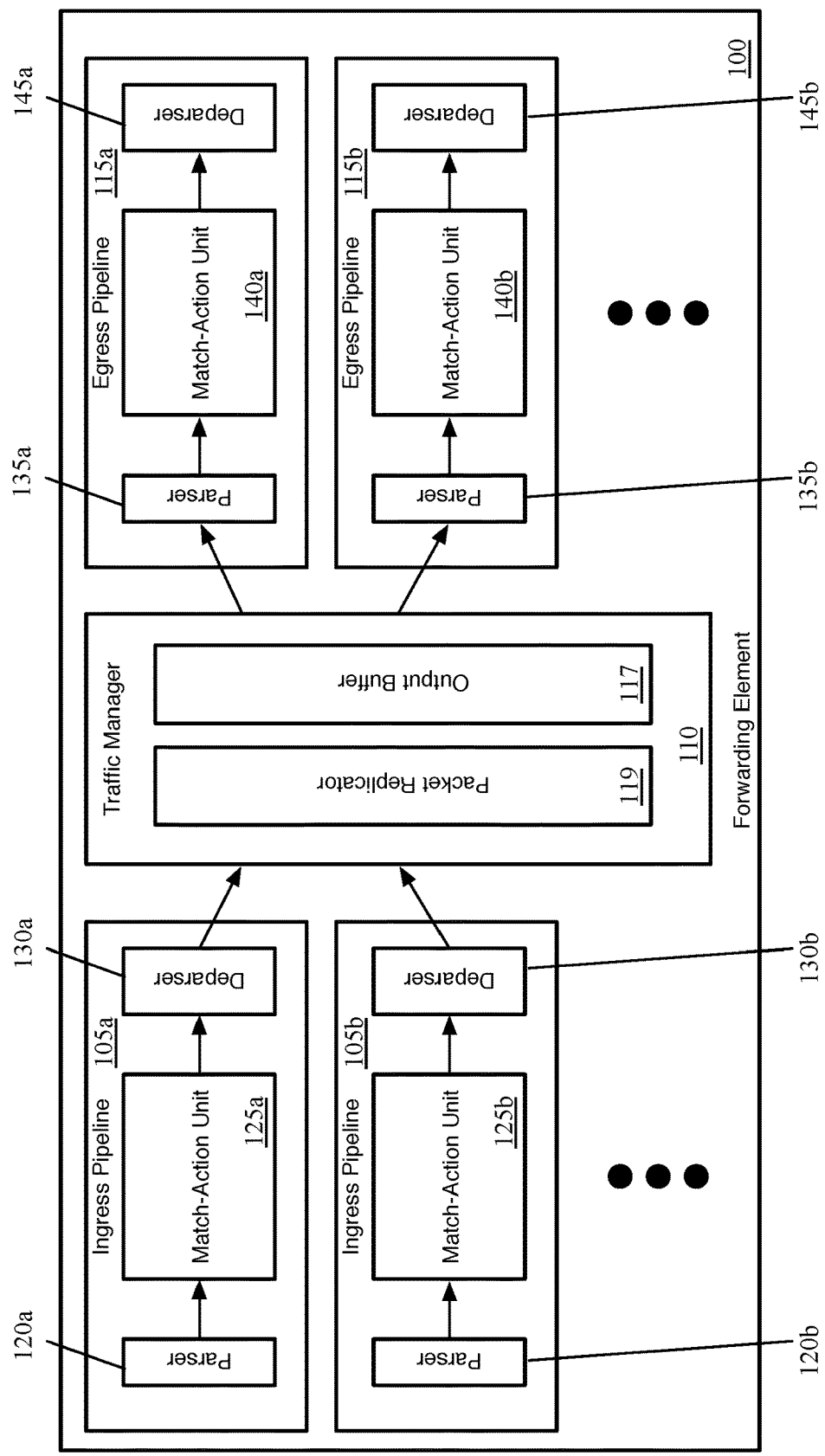
FIG. 1 conceptually illustrates the structure of the pipeline of a hardware forwarding element of some embodiments.

FIG. 1 conceptually illustrates the structure of the pipeline of such a hardware forwarding element of some embodiments. Specifically, FIG. 1 illustrates several ingress pipelines 105, a traffic management unit (referred to as a traffic manager) 110, and several egress pipelines 115. When the forwarding element 100 receives a packet, in some embodiments the packet is directed to one of the ingress pipelines 105 (each of which may correspond to one or more ports of the forwarding element). After passing through the selected ingress pipeline 105, the packet is sent to the traffic manager 110, where the packet is enqueued (one or more queues corresponds to each egress pipeline 115) and placed in the output buffer 117. The traffic manager 110 then dispatches the packet to the appropriate egress pipelines 115 (each of which may correspond to one or more ports of the forwarding element). In some embodiments, there is no necessary correlation between which of the ingress pipelines 105 processes a packet and to which of the egress pipelines 115 the traffic manager 110 dispatches the packet. That is, a packet might be initially processed by ingress pipeline 105b after receipt through a first port, and then subsequently by egress pipeline 115a to be sent out a second port, etc.

Each ingress pipeline 105 includes a parser 120, a match-action unit (MAU) 125, and a deparser 130. Similarly, each egress pipeline 115 includes a parser 135, a MAU 140, and a deparser 145. The parser 120 or 135, in some embodiments, receives a packet as a formatted collection of bits in a particular order, and parses the packet into its constituent header fields according to a parse graph state machine. That is, the parser starts from the beginning of the packet and parses each header field in order, assigning these header fields to fields (e.g., data containers) of a packet header vector for processing. Based on the values of certain fields (e.g., the Ethertype field of an Ethernet header, the Protocol field of an Internet Protocol header, etc.), the parser can determine the structure of the next set of header fields. In some embodiments, the parser 120 or 135 separates out the packet headers (up to a designated point) from the payload of the packet, and sends the payload (or the entire packet, including the headers and payload) directly to the deparser without passing through the MAU processing (e.g., on a single wire).

The MAU 125 or 140 performs processing on the packet data (i.e., the packet header vector). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU.

The deparser 130 or 145 reconstructs the packet using the packet header vector as modified by the MAU 125 or 140 and the payload received directly from the parser 120 or 135. The deparser constructs a packet that can be sent out over the physical network, or to the traffic manager 110.

The traffic manager 110, as shown, includes a packet replicator 119 and the previously-mentioned output buffer 117. In some embodiments, the traffic manager 110 may include other components, such as a feedback generator for sending signals regarding output port failures, a series of queues and schedulers for these queues, as well as additional components. The packet replicator 119 of some embodiments performs replication for broadcast/multicast packets, generating multiple packets to be added to the output buffer (e.g., to be distributed to different egress pipelines).

The output buffer 117 is part of a queuing and buffering system of the traffic manager in some embodiments. The traffic manager 110 provides a shared buffer that accommodates any queuing delays in the egress pipelines. In some embodiments, this shared output buffer 117 stores packet data, while references (e.g., pointers) to that packet data are kept in different queues for each egress pipeline 115. The egress pipelines request their respective data from the common data buffer using a queuing policy that is control-plane configurable (and, in some embodiments, further configurable by decisions made within the ingress and egress pipelines).

When a packet data reference reaches the head of its queue and is scheduled for dequeuing, the corresponding packet data is read out of the output buffer 117 and into the corresponding egress pipeline 115. In some embodiments, the settings for individual queues that are used by the scheduler are configurable via data generated by the ingress and/or egress pipelines. In some embodiments, packet data may be referenced by multiple pipelines (e.g., for a multicast packet). In this case, the packet data is not removed from this output buffer 117 until all references to the packet data have cleared their respective queues.

Figure 2:
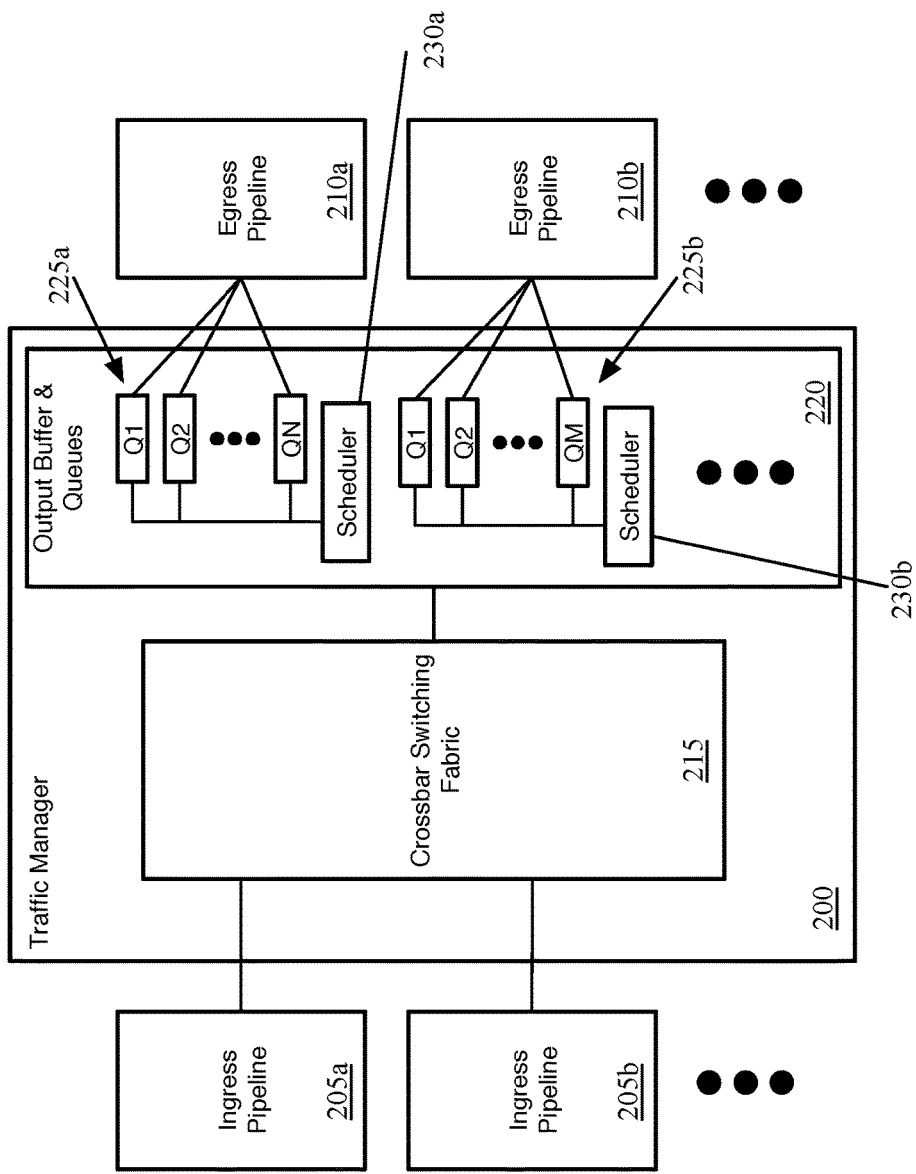
FIG. 2 conceptually illustrates a traffic manager in more detail.

FIG. 2 conceptually illustrates a traffic manager 200 in more detail. In this example, as in the case above, the primary packet data flow is from left (ingress) to right (egress). This figure illustrates multiple ingress pipelines 205 that send packets to the traffic manager 200 and multiple egress pipelines 210 that receive data from the traffic manager 200. The traffic manager 200 includes a crossbar switching fabric 215 and an output buffer 220 (shown with multiple queues). The hardware switching fabric 215 directs a data packet from an ingress pipeline (or, in some embodiments, an ingress queue associated with an ingress pipeline) to a specific portion of the output buffer. Though shown as a single block in FIGS. 1 and 2, in some embodiments the output buffer is actually a set of separate buffer units with a single controller that manages the buffers. The hardware switching fabric 215 also handles the packet replication performed by the traffic manager 200 in some embodiments.

As mentioned, each of the egress pipelines 210 is associated with one or more ports of the forwarding element in some embodiments (similarly, each of the ingress pipelines is also associated with one or more of the ports). The traffic manager 200 includes multiple queues for each egress pipeline 210, with each queue associated with one egress pipeline. As shown in this example, the traffic manager 200 includes queues 1-N for the first egress pipeline 210a, queues 1-M for the second egress pipeline 210b, etc. Some embodiments have different numbers of queues for different egress pipelines, while other embodiments require the same number of queues for each egress pipeline.

The queues are associated with the output buffer 220 in some embodiments, and as such are shown as part of this buffer in this figure. As mentioned above, some embodiments store packet data in the output buffer until that packet is released to the appropriate egress pipeline. When the traffic manager 200 stores the data for a packet in a location in the output buffer, the traffic manager 200 also enqueues the packet into one of the queues for the egress pipeline. In some embodiments, the traffic manager stores in the appropriate queue a reference (e.g., a pointer) to the location in the buffer in order to enqueue the packet.

To manage order in which packets are released from the queues into the egress pipelines, each set of queues 225 (for an egress pipeline 210) includes a scheduler unit 230. In this example, the traffic manager 200 includes a separate scheduler unit 230 for each set of queues 230. In other embodiments, the traffic manager 200 includes a single physical scheduler block, which schedules each set of queues 225 independently (and thus logically acts as separate schedulers for each pipeline 210).

In different embodiments, the schedulers 230 schedule their respective queues 225 according to different algorithms, such as first in first out (FIFO), weighted random early detection (WRED) or similar algorithms, fair queuing or similar algorithms, etc. In some embodiments, as described in detail below, the schedulers 230 use a hierarchical scheduling process. The schedulers 230 can also be configured by the control plane in some embodiments. Specifically, in some embodiments, each queue in a set of queues 225 is configured with a maximum scheduling rate (e.g., in either packets per second or bits per second), which is the rate at which packets can be scheduled for dequeuing from the queue. The scheduler 230 maintains a remaining limit (referred to as a "bucket") for each queue, which can range in some embodiments from 0 to a maximum queue burst size (which may be a global setting or a setting specific to the queue). The scheduler 230 adds to the bucket at the maximum scheduling rate amount (e.g., if the rate for a particular queue is 10 pps, the scheduler 230 adds 10 packets to the remaining limit for the particular queue each second, so long as this does not exceed the maximum queue burst size). Similarly, in normal operation, the scheduler 230 subtracts from the remaining limit for each packet scheduled for dequeuing.

In some embodiments, the match-action stages of the ingress and/or egress pipelines may store instructions with a packet to modify these queue buckets, and thereby affect scheduling. In order to store the queue modification instructions with the data for a packet, in some embodiments a multi-stage packet processing pipeline adds the instructions to the packet data used by the pipeline that is passed from stage to stage. In some embodiments, each ingress and egress pipeline includes a parser, a match-action unit with a series of match-action stages, and a deparser. The parser initially receives the packet (i.e., from the physical port for an ingress pipeline, or from the traffic management unit for an egress pipeline) as a formatted sequence of bits (i.e., arranged in header fields according to specific protocols) and parses this data into the constituent header fields. These constituent header fields are arranged into a packet header vector, which is passed from stage to stage, while the remainder of the packet (i.e., the payload) is sent outside of the match-action unit (e.g., directly to the deparser to be combined with the packet header vector after processing).

Figure 3:
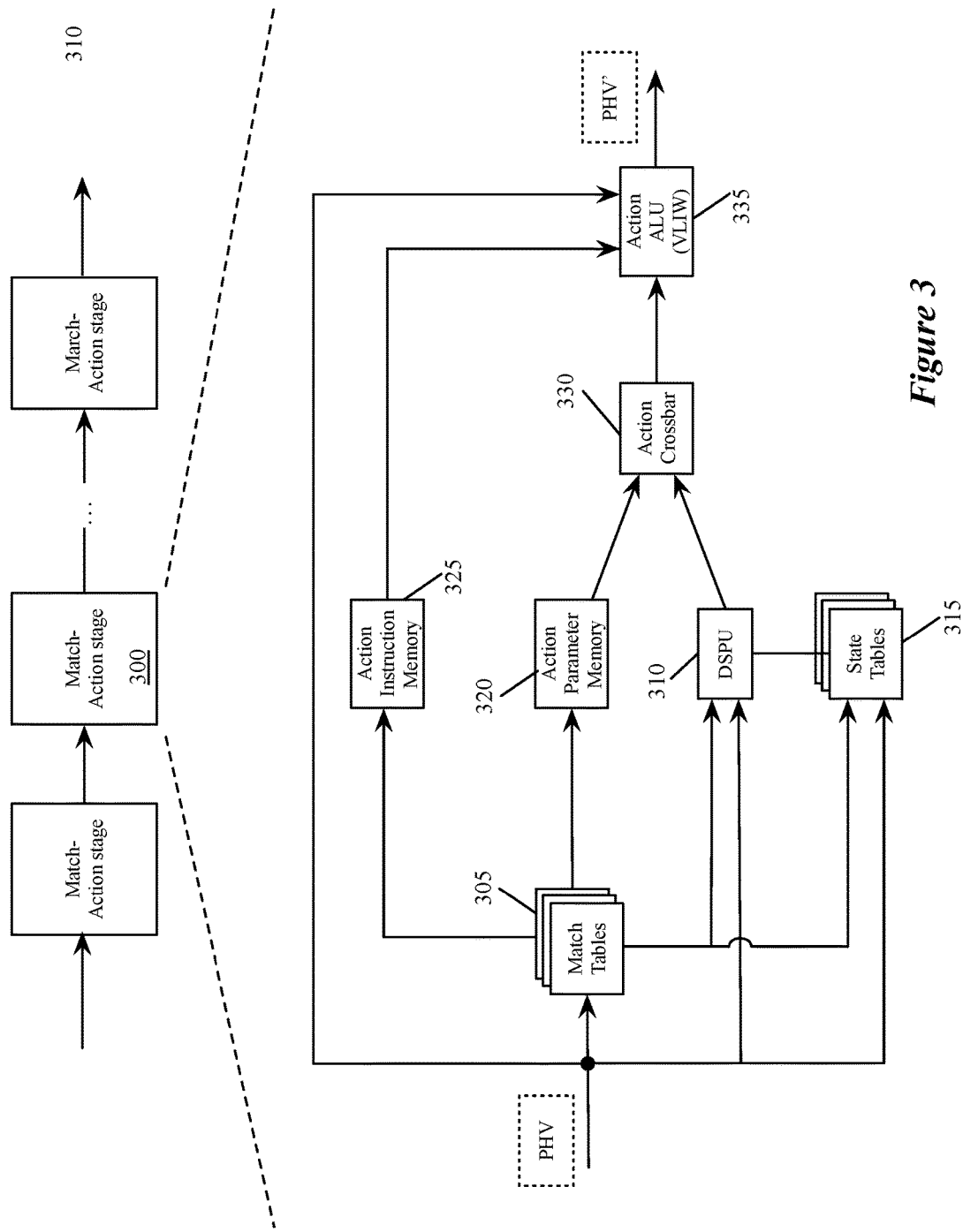
FIG. 3 conceptually illustrates the packet-processing circuitry of a data plane match-action stage of a packet processing pipeline (e.g., an ingress or egress pipeline) of some embodiments.

FIG. 3 conceptually illustrates the packet-processing circuitry of a data plane match-action stage 300 of a packet processing pipeline (e.g., an ingress or egress pipeline) of some embodiments. As mentioned above, an ingress pipeline or egress pipeline of some embodiments has several MAU stages, each of which includes packet-processing circuitry for forwarding received data packets and/or performing stateful operations based on these data packets. These operations are performed by processing values stored in the PHVs of the packets.

As shown in FIG. 3, the MAU stage 300 in some embodiments has a set of one or more match tables 305, a data plane stateful processing unit 310 (DSPU), a set of one or more stateful tables 315, an action crossbar 330, an action parameter memory 320, an action instruction memory 325, and an action arithmetic logic unit (ALU) 335. The match table set 305 can compare one or more fields in a received PHV to identify one or more matching flow entries (i.e., entries that match the PHV). The match table set can be TCAM tables or exact match tables in some embodiments. In some embodiments, the match table set can be accessed at an address that is a value extracted from one or more fields of the PHV, or it can be a hash of this extracted value.

In some embodiments, the value stored in a match table record that matches a packet's flow identifier, or that is accessed at a hash-generated address, provides addresses for the action parameter memory 320 and action instruction memory 325. Also, such a value from the match table can provide an address and/or parameter for one or more records in the stateful table set 315, and can provide an instruction and/or parameter for the DSPU 310. As shown, the DSPU 310 and the stateful table set 315 also receive a processed PHV. The PHVs can include instructions and/or parameters for the DSPU, while containing addresses and/or parameters for the stateful table set 315.

The DSPU 310 in some embodiments performs one or more stateful operations, while a stateful table 315 stores state data used and generated by the DSPU 310. In some embodiments, the DSPU is a programmable arithmetic logic unit (ALU) that performs operations synchronously with the dataflow of the packet-processing pipeline (i.e., synchronously at the line rate). As such, the DSPU can process a different PHV on every clock cycle, thus ensuring that the DSPU would be able to operate synchronously with the dataflow of the packet-processing pipeline. In some embodiments, a DSPU performs every computation with fixed latency (e.g., fixed number of clock cycles). In some embodiments, the local or remote control plane provides configuration data to program a DSPU.

The DSPU 310 outputs an action parameter to the action crossbar 330. The action parameter memory 320 also outputs an action parameter to this crossbar 330. The action parameter memory 320 retrieves the action parameter that it outputs from its record that is identified by the address provided by the match table set 305. The action crossbar 330 in some embodiments maps the action parameters received from the DSPU 310 and action parameter memory 320 to an action parameter bus 340 of the action ALU 335. This bus provides the action parameter to this ALU 335. For different data packets, the action crossbar 330 can map the action parameters from DSPU 310 and memory 320 differently to this bus 340. The crossbar can supply the action parameters from either of these sources in their entirety to this bus 340, or it can concurrently select different portions of these parameters for this bus.

The action ALU 335 also receives an instruction to execute from the action instruction memory 325. This memory 325 retrieves the instruction from its record that is identified by the address provided by the match table set 305. The action ALU 340 also receives the PHV for each packet that the MAU processes. Such a PHV can also contain a portion or the entirety of an instruction to process and/or a parameter for processing the instruction.

The action ALU 340 in some embodiments is a very large instruction word (VLIW) processor. The action ALU 340 executes instructions (from the instruction memory 335 or the PHV) based on parameters received on the action parameter bus 340 or contained in the PHV. The action ALU stores the output of its operation in the PHV in order to effectuate a packet forwarding operation and/or stateful operation of its MAU stage 300. The output of the action ALU forms a modified PHV (PHV') for the next MAU stage. In some embodiments, these actions may include adding fields to the packet header vector that are not actually packet header fields, but instead carry instructions to other units of the forwarding element. For instance, the action ALU 340 at certain stages may add data to the PHV that specifies how to modify the scheduler bucket for a particular queue or queues of the traffic manager.

In other embodiments, the match tables 305 and the action tables 315, 320 and 325 of the MAU stage 300 can be accessed through other methods as well. For instance, in some embodiments, each action table 315, 320 or 325 can be addressed through a direct addressing scheme, an indirect addressing scheme, and an independent addressing scheme. The addressing scheme that is used depends on the configuration of the MAU stage, which in some embodiments, is fixed for all data packets being processed, while in other embodiments can be different for different packets being processed.

In the direct addressing scheme, the action table uses the same address that is used to address the matching flow entry in the match table set 305. As in the case of a match table 305, this address can be a hash generated address value or a value from the PHV. Specifically, the direct address for an action table can be a hash address that a hash generator (not shown) of the MAU generates by hashing a value from one or more fields of the PHV. Alternatively, this direct address can be a value extracted from one or more fields of the PHV.

On the other hand, the indirect addressing scheme accesses an action table by using an address value that is extracted from one or more records that are identified in the match table set 305 for a PHV. As mentioned above, the match table records are identified through direct addressing or record matching operations in some embodiments.

The independent addressing scheme is similar to the direct addressing scheme except that it does not use the same address that is used to access the match table set 305. Like the direct addressing scheme, the table address in the independent addressing scheme can either be the value extracted from one or more fields of the PHV, or it can be a hash of this extracted value. In some embodiments, not all the action tables 315, 320 and 325 can be accessed through these three addressing schemes, e.g., the action instruction memory 325 in some embodiments is accessed through only the direct and indirect addressing schemes.

As mentioned, some embodiments store the queue modification instructions in this packet header vector. In some embodiments, the packet header vector is made up of a set of data containers (e.g., 32 bit containers, 24 bit containers, etc.) that can be individually manipulated. When the action unit of a particular match-action stage specifies to store queue modification instructions with a packet, some embodiments store this data in a specific container. The match-action unit stores a port identifier and queue identifier that together identify the specific queue to be manipulated, and then the actual setting modification instructions for that queue in the remainder of the container.

Figure 4:
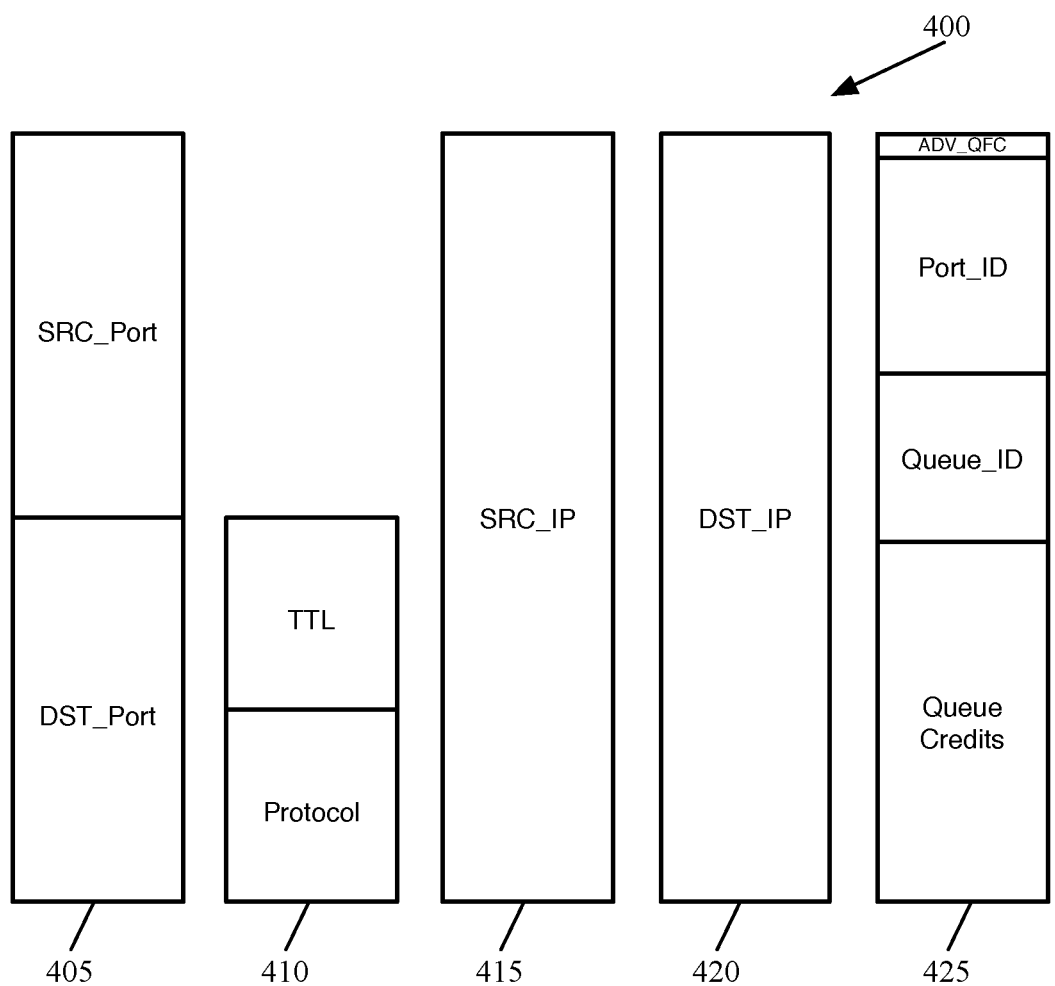
FIG. 4 illustrates an example of a portion of a packet header vector, with multiple data containers storing different types of data.

FIG. 4 illustrates an example of a portion of a packet header vector 400, with multiple data containers storing different types of data. Specifically, the packet header vector portion 400 includes four containers 405-420 that store packet header field values and a container 425 that stores queue modification instructions. Of the first four containers 405-420, three of these containers 405, 415, and 420 are 32-bit containers, while the second container 415 is a 16-bit container. The container 405 stores both the source and destination transport layer port numbers, the container 410 stores the time to live and protocol fields of a packet's Internet Protocol (IP) network layer header, and the containers 415 and 420 store the source and destination IP addresses, respectively. Different embodiments may store packet header fields in different containers or different combinations of fields in containers together, so long as the forwarding element parser follows a preconfigured structure so that the match-action packet processing stages can match against and modify the correct fields.

As mentioned, the fifth packet header vector container 425 stores queue modification instructions. In some embodiments, a match-action stage populates this container 425 based on a decision that the scheduler settings for a particular queue are to be modified. As shown, in some embodiments the packet header vector container for the queue modification instructions is a 32-bit container. Different embodiments allocate these bits differently (and/or use a different sized container), but the example of FIG. 4 shows one such allocation. In this example, a first bit identifies (as a binary 0/1) whether the modification instructions are for advanced queue flow control or conventional port flow control. In addition, the container allocates nine bits to the port identifier and seven bits to the queue identifier. The port identifier specifies the port, and thus effectively specifies a set of queues. The queue identifier specifies a queue within that set.

Lastly, the container 425 of some embodiments allocates 15 bits for the modification instructions. In some embodiments, the queue modification instructions modify the scheduler bucket for the identified queue. For instance, the queue modification instructions may add to the bucket for a particular queue, which will allow the scheduler to dequeue packets from the particular queue more quickly. In some embodiments, this causes the scheduler algorithm to give more weight to the particular queue when selecting a queue for scheduling. The queue modification instructions may also subtract from the bucket for a particular queue, which will limit the rate at which the scheduler dequeues packets from the particular queue (and in some embodiments, causes the scheduler algorithm to give less weight to the particular queue when selecting a queue for scheduling). In some embodiments, these queue modification instructions (credits) may only increase the bucket size up to the maximum queue burst size and decrease the bucket size to 0.

The 15-bit queue credit field is interpreted as a signed short integer in some embodiments (i.e., the field may be positive or negative, depending on whether the credits add or subtract from the queue scheduler bucket), with the units being either packets or bits depending on whether the queue rates are defined in bits per second or packets per second. In bits per second mode, the 15-bit field can represent up to +/−16 KiB, which is typically adequate for a switch-local control but not large enough for network-wide control. To handle larger bandwidth-delay product, the credit value can be scaled up to 2^10 (using a left-shift of up to 10-bits, thereby representing up to +/−16 MiB. In packets per second mode, the 15-bit value is more than adequate generally.

Alternatively or conjunctively to the use of these queue credits, in some embodiments the queue setting modification instructions specify simply to turn on or off scheduling for a queue (Xon/Xoff). That is, rather than adjust the bucket size, the queue modification instructions may turn off scheduling entirely for a particular queue, such that the queue will not be scheduled (and thus no packets will be dequeued from that queue). To re-initiate scheduling for a queue, the queue modification instructions can also turn scheduling back on for a queue that was previously turned off, such that the queue will be scheduled again (and packets will start being dequeued from that queue).

Both the ingress pipelines and egress pipelines may modify the scheduler settings for a queue in some embodiments. Specifically, in some embodiments, a given ingress pipeline can store instructions with a packet to modify any queue of any egress pipeline, even if (i) that egress pipeline is associated with a different set of ports than the ingress pipeline and/or (ii) the packet used to modify the queue will be sent to a queue associated with a different egress pipeline. Similarly, an egress pipeline in some embodiments can store instructions with a packet to modify any of the queues associated with any egress pipeline. On the other hand, in some other embodiments an egress pipeline can only store instructions with a packet to modify any of the queues associated with that egress pipeline, and not queues associated with any of the other egress pipelines.

The ingress pipelines may receive flow control packets from other forwarding elements specifying flows or sets of flows that are causing those forwarding elements to back up, and thus can modify the queue scheduling settings for the queues to which these flows are sent. Flow control is a technique used by a first network element (e.g., a forwarding element) to notify one or more additional forwarding elements when those additional forwarding elements are overloading the first network element with traffic. Specifically, in some types of flow control, the first network element sends flow control messages to a sender to indicate various aspects regarding its ongoing ability to receive and process packets. These may be simple messages requesting that transmission of a particular flow be turned off or on, or messages that indicate the current buffer status at the receiver. In response to the receipt of such a flow control message, a match-action stage of the ingress pipeline is configured in some embodiments to modify the scheduler settings for a queue in the traffic manager (e.g., the queue to which the flow specified in the flow control message is assigned).

Figure 5:
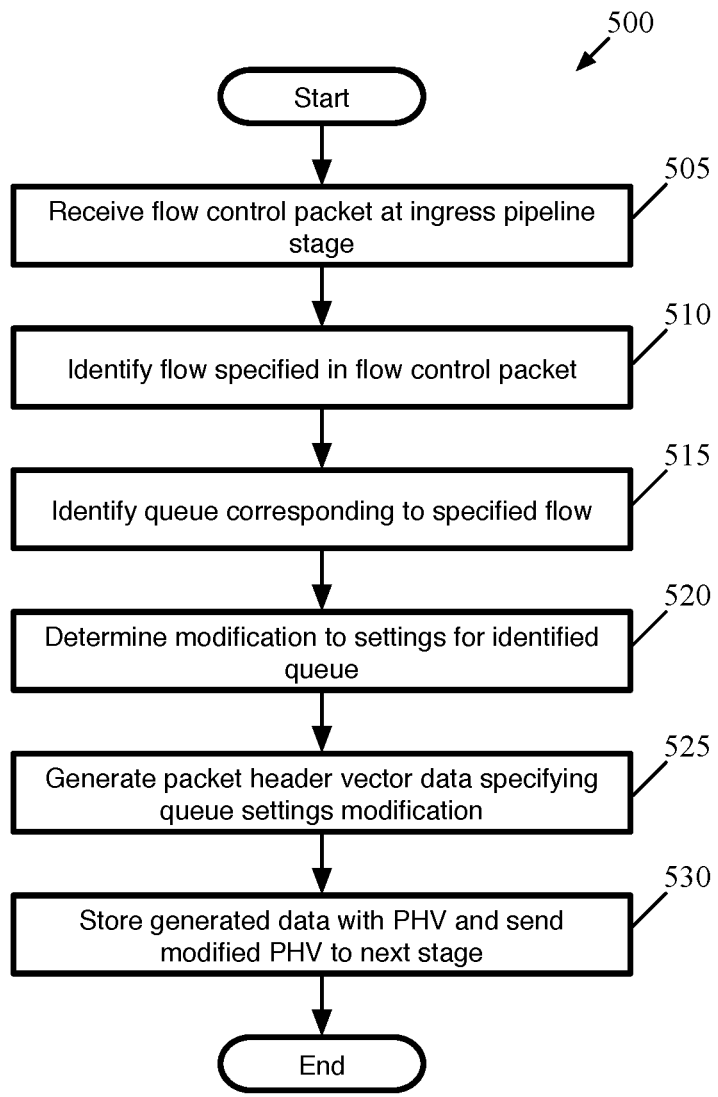
FIG. 5 conceptually illustrates a process of some embodiments performed to process a flow control message.

FIG. 5 conceptually illustrates a process 500 of some embodiments performed to process such a flow control message. In some embodiments, the process 500 is performed by the match-action circuitry of a match-action pipeline stage in a hardware forwarding element (e.g., the circuitry shown in FIG. 3). In some embodiments, the operations shown in FIG. 5 are confined to a single match-action stage, which stores queue setting modification instructions with a packet header (with those queue setting modification instructions used at a later packet processing stage by the forwarding element). While the description of the process 500 relates to an ingress pipeline match-action stage, it should be understood that in some embodiments, an egress pipeline stage performs similar operations based on analysis of flow control messages from other forwarding elements.

As shown, the process 500 begins by receiving (at 505) a flow control packet at an ingress pipeline stage (e.g., a match-action stage). As mentioned, the flow control packet may be sent by another network element (e.g., another forwarding element, a traffic recipient, etc.) if the network element is receiving traffic from the hardware forwarding element at a faster rate than the network element can process. If the network element has previously sent a flow control packet to the hardware forwarding element, causing the hardware forwarding element to slow down or pause its sending of packets to the network element, the network element might send a message indicating that its buffer has freed up (and, thus, that the hardware forwarding element can resume sending packets or start sending them at a faster rate).

The process 500 then identifies (at 510) a flow specified in the flow control message. In some embodiments, when a specific flow is causing a backup at the network element, the network element sends a flow control message that specifies to stop (or slow down) the sending of packets for that specific flow. In other embodiments, the hardware forwarding element stores data (e.g., in stateful tables) that indicate the output port and/or next hop network element for data flows processed by the forwarding element, and can identify the flow (or flows) that corresponds to a destination that has sent a flow control message (which may specify to stop or slow down sending of packets, or may specify its current buffer capacity).

For the illustrated process 500, it is assumed that the received flow control message corresponds to a single egress queue. However, in other embodiments, a flow control message may result in the need to modify the scheduler settings for multiple queues. Some embodiments attach multiple containers with queue modification instructions to the packet header vector in this case. Other embodiments, however, may only store modification instructions for a single queue with each packet. Some such embodiments store the information regarding additional flows in a stateful table and append additional queue modification instruction containers to subsequent packet header vectors processed by that match-action stage.

Next, the process 500 identifies (at 515) the queue that corresponds to the identified flow. Different embodiments perform this mapping of flow to queue differently. Some embodiments store a stateful table in the ingress pipeline match-action stage that the forwarding element updates as flows are assigned to queues. In some other embodiments, the traffic manager assigns flows to queues according to preconfigured rules (e.g., using a hash of the various header values in the 5-tuple), which can be recreated by the match-action stage.

In some embodiments, each flow is mapped to a configuration queue identifier (i.e., a queue as specified in the administrator configuration), which itself maps to a physical queue in the hardware. Some embodiments populate the configuration queue identifier to which a flow control packet relates (i.e., to which the queue modification settings apply) prior to the last ingress pipeline stage, then map this to a physical hardware queue at the last match-action stage of the ingress pipeline.

The process 500 also determines (at 520) the modification to the settings for the identified queue. In some embodiments, this is simply a matter of specifying whether to turn off or turn on scheduling for the identified queue, based on the flow control message. In other embodiments, the match-action stage translates information provided by the flow control message, a stateful table storing previous flow control data, or a combination thereof into a positive or negative credit amount for the queue. If the hardware forwarding element uses the credit control mode and wants to simply turn off the queue, some embodiments use the maximum negative credit value, as the subtraction mechanism used by the scheduler will only drop the queue bucket down to 0.

Finally, the process 500 generates (at 525) the packet header vector data specifying the queue settings modification, and stores (at 530) this generated data with the packet header vector (and sends the modified packet header vector to the next stage of the ingress pipeline). FIG. 4, described above, illustrates one example of the packet header vector data stored to modify the settings of a particular queue in some embodiments. As shown in that figure, some embodiments use a 32-bit container that stores an advanced queue flow control bit, a port identifier, a queue identifier, and a credit amount (or XON/XOFF setting). This data is sent along to the match circuitry of the next ingress stage, or to the traffic manager if the process 500 is performed at the last ingress pipeline stage. The process 500 then ends.

Figure 6:
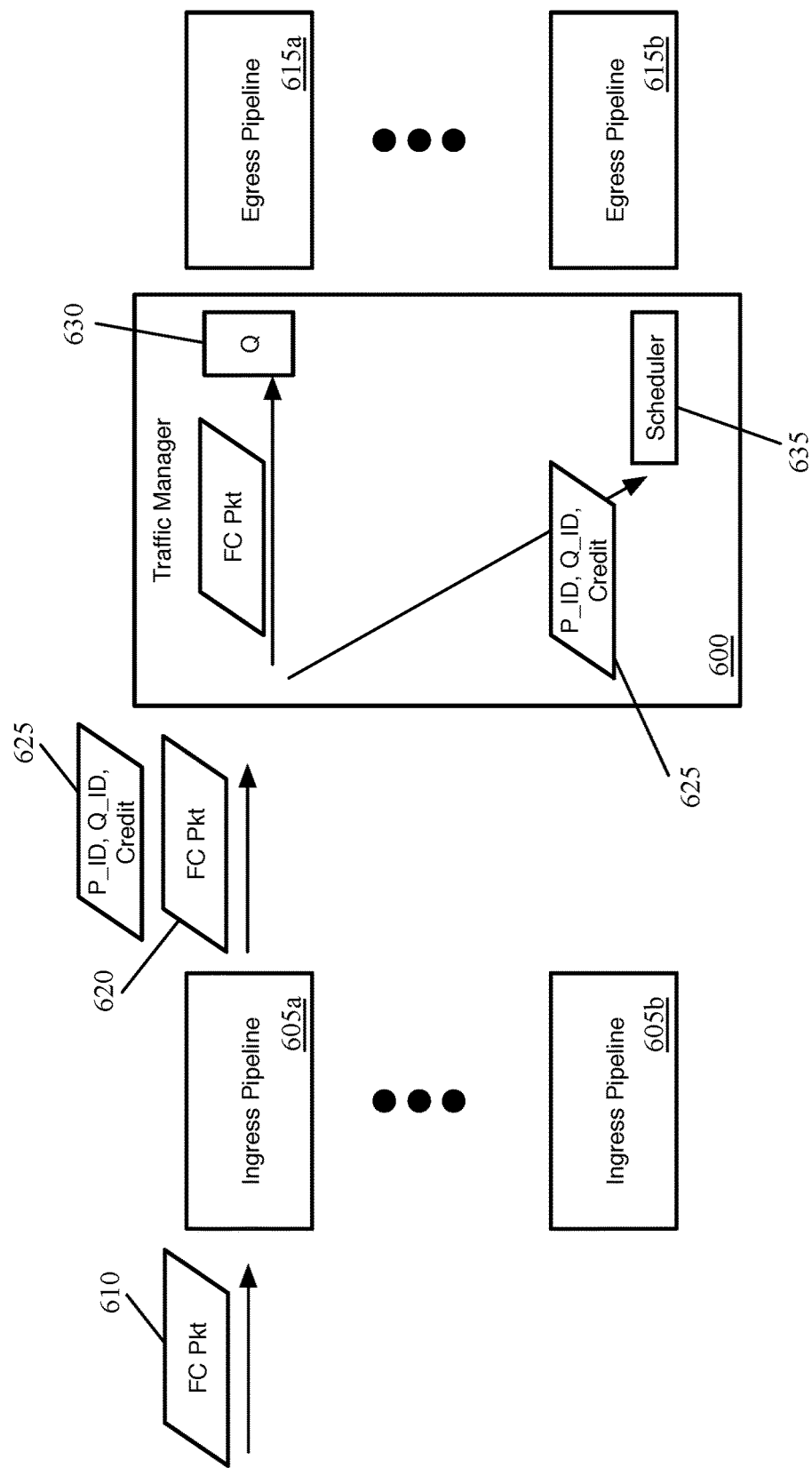
FIG. 6 conceptually illustrates an example of an ingress pipeline receiving a flow control packet and generating queue modification instructions to pass to the traffic manager according to some embodiments.

FIG. 6 conceptually illustrates an example of an ingress pipeline 605*a* receiving a flow control packet 610 and generating queue modification instructions to pass to the traffic manager 600 according to some embodiments. As shown, the ingress pipeline 605*a* is one of multiple ingress pipelines 605 of a hardware forwarding element that also includes a traffic manager 600 and multiple egress pipelines 615. In this example, the ingress pipeline 605*a* corresponds to the same set of physical ports as the egress pipeline 615*a*, the ingress pipeline 605*b* corresponds to the same set of physical ports as the egress pipeline 615*b*, etc. The traffic manager 600, as with the traffic manager described above by reference to FIG. 2, includes multiple queues for each egress pipeline 615, and a scheduler for each set of queues (i.e., for each egress pipeline).

As illustrated in the figure, the ingress pipeline 605*a* receives a flow control packet 610. The pipeline 605*a* parses this packet to determine its packet header vector, and passes the packet header vector data through its multiple match-action stages. During this process, the ingress pipeline 605*a* modifies the packet header vector in various ways, including populating a container with queue modification instructions based on the flow control packet. After the match-action processing is complete, the ingress pipeline deparser reconstructs the packet 620 using the modified packet header vector (noting that the resultant packet 620 may have different header field values than the initial packet 610).

In some embodiments, in addition to reconstructing the packet, the ingress pipeline deparser identifies specific data in the packet header vector (e.g., specific data containers) that do not actually store packet header information, and performs any necessary operations. Thus, for example, the queue setting modification instructions are not part of the actual reconstructed packet header; instead, this information is provided to the appropriate traffic manager scheduler. For ingress packets, this information is sent with the packet to the traffic management unit, so that the traffic management unit can process the queue setting modification.

In the figure, the queue setting modification instructions 625 that the deparser identifies and sends to the traffic manager 600 include the port identifier, queue identifier, and positive or negative credit amount (or XON/XOFF instructions). As shown in this example, the packet that carries the queue modification instructions need not be sent to the same queue, or even the same egress pipeline, as the queue being modified. Furthermore, the queue being modified may be one of the queues for an egress pipeline that is associated with a different set of ports than the ingress pipeline that processed the packet. In this case, the packet 620 is placed in a queue 630 associated with the egress pipeline 615*a*. However, the queue settings modification data 625 is sent to the scheduler 635 for the set of queues corresponding to the egress pipeline 615*b*. The scheduler 635 therefore adjusts its scheduling bucket (also referred to as a rate shaper bucket) for the queue specified by the queue identifier in the data 625.

One point of concern for ingress pipeline packets that carry queue settings modification data is that those packets not be dropped before their data is received by the traffic manager. For example, if a packet has bit errors, in some embodiments the traffic manager drops the packet before enqueuing the packet or reading the queue modification data to the appropriate scheduler. Similarly, if the ingress pipeline drops the packet, some embodiments do not have a mechanism to pass the queue settings modification data to the traffic manager without the remainder of the packet. However, such issues can be handled by the ingress pipeline configuration (e.g., by mandating that packets with a queue settings modification container should not be dropped, even if they would be otherwise. However, if a packet is tail dropped by the traffic manager (because there is no room in its queue for the packet), some embodiments will have read the queue settings modification data prior to dropping the packet and thus the change to the queue settings will be taken into account by the scheduler.

While the ingress pipelines are optimally located in the forwarding element to analyze incoming packets and determine when queue settings should be modified based on those packets, the egress pipelines are better situated to store and analyze stateful data regarding the queue status and make decisions regarding the queue settings based on this. In some embodiments, the traffic manager passes queue statistics (e.g., queue depth, latency, etc.) to the egress pipelines along with a packet, and the egress pipelines adjust the queue settings based on this status data. For example, if the queue statistics indicate that packets are staying in the queue for too long (as an absolute time, or relative to stateful data stored for other queues that feed into the pipeline), some embodiments add credit to that queue.

Figure 7:
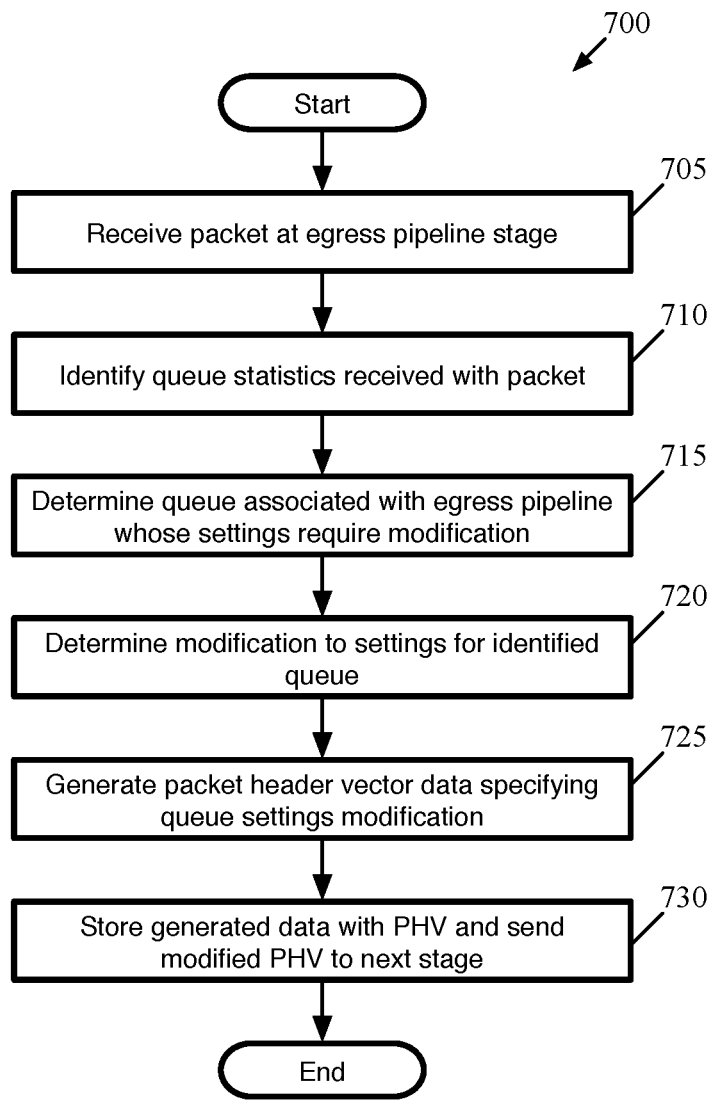
FIG. 7 conceptually illustrates a process of some embodiments performed to use queue statistics to generate queue modification instructions.

FIG. 7 conceptually illustrates a process 700 of some embodiments performed to use queue statistics to generate queue modification instructions. In some embodiments, the process 700 is performed by the match-action circuitry of an egress pipeline match-action stage in a hardware forwarding element (e.g., the circuitry shown in FIG. 3). In some embodiments, the operations shown in FIG. 7 are confined to a single match-action stage, which stores queue setting modification instructions with a packet header (with those queue setting modification instructions used at a later packet processing stage to actually modify the queue in the forwarding element). It should be noted that, while FIG. 7 refers to operations performed by an egress pipeline, in some embodiments these operations could also be performed by the match-action circuitry of an ingress pipeline. For example, packets carrying queue data could be recirculated to the ingress pipeline, with one of the ingress stages configured to analyze this queue data and store queue setting modification instructions with the packet.

As shown, the process 700 begins by receiving (at 705) a packet at an egress pipeline stage (e.g., a match-action stage). The process also identifies (at 710) queue statistics received with the packet. In some embodiments, each packet released by the traffic manager to an egress pipeline carries with it statistics about its queue. Some embodiments include the statistics in a specific portion (e.g., a specific data container) of the packet header vector, while other embodiments pass this data along with the packets in different ways. The queue statistics sent from the traffic manager with packets may include the queue depth (portion of the queue that is currently filled and/or available) and latency (length of time from when the packet was placed in the queue until the packet is released from the queue) in some embodiments, while other embodiments may include different or additional queue statistics.

Next, the process 700 determines (at 715) a queue associated with the egress pipeline, the settings of which require modification. The process also determines (at 720) the modification to the settings for the identified queue. In some embodiments, the match-action stage of the egress pipeline uses just the queue statistics received with the packet to determine whether to modify the queue settings for the queue from which the packet was released. For instance, if the latency is high compared to the queue depth (i.e., the packet waited too long in the queue to be released, given the backup in the queue), some embodiments will add credit to that queue so that the scheduler will release packets from the queue more often.

In some embodiments, the match-action stores stateful data regarding the multiple queues associated with that egress pipeline (e.g., in a stateful table associated with the DSPU for the match-action stage). In some such embodiments, the egress pipeline evaluates the queue state with each packet received carrying queue statistics. With the storage of queue statistics data, the egress pipeline can determine which of its queues require modification, even if that queue is not the queue that stored the current packet. For example, if a packet is received from a first queue with a low queue depth, and with low latency compared to a second queue, some embodiments will add credit to the second queue or turn off scheduling for the first queue. Several packets later, the egress pipeline can turn scheduling back on for that first queue, irrespective of the queue from which the later packet is received.

Finally, the process 700 generates (at 725) the packet header vector data specifying the queue settings modification, and stores (at 730) this generated data with the packet header vector (and sends the modified packet header vector to the next stage of the ingress pipeline). FIG. 4, described above, illustrates one example of the packet header vector data stored to modify the settings of a particular queue in some embodiments. As shown in that figure, some embodiments use a 32-bit container that stores an advanced queue flow control bit, a port identifier, a queue identifier, and a credit amount (or XON/XOFF setting). This data is sent along to the match circuitry of the next egress pipeline stage, and eventually used to send a message to the traffic manager at the end of the egress pipeline. Specifically, in some embodiments the egress pipeline sends a byte-adjust transmission to the traffic manager, and the queue settings modification instructions are attached to this transmission. The process 700 then ends.

Figure 8:
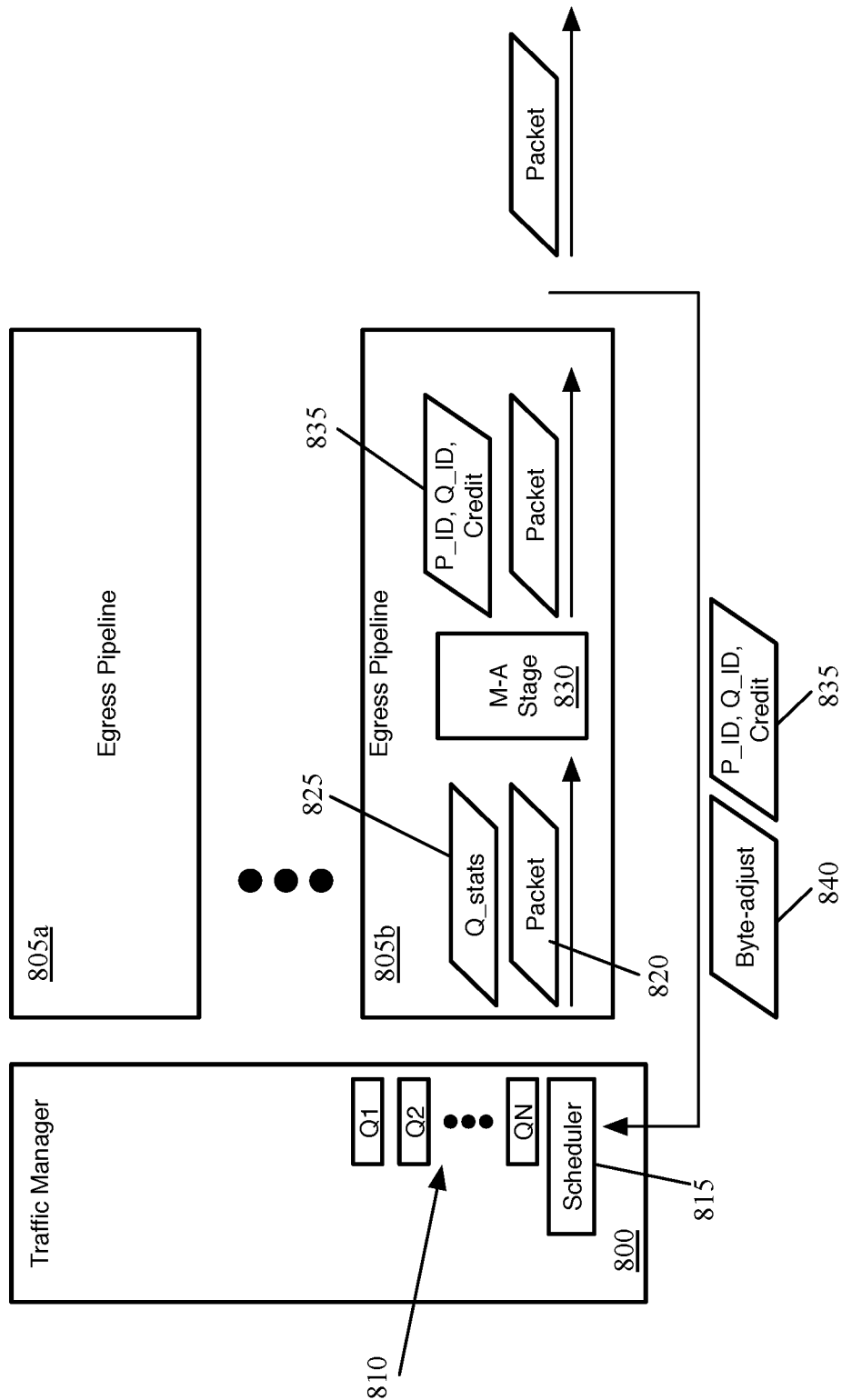
FIG. 8 conceptually illustrates an example of an egress pipeline receiving a packet with queue statistics and generating queue modification instructions that are passed to the traffic manager according to some embodiments.

FIG. 8 conceptually illustrates an example of an egress pipeline 805b receiving a packet with queue statistics and generating queue modification instructions that are passed to the traffic manager 800 according to some embodiments. As shown, the egress pipeline 805b is one of multiple egress pipelines of a hardware forwarding element that also includes a traffic manager 800 (and multiple ingress pipelines that are not shown in this figure). The traffic manager 800, as with the traffic manager described above by reference to FIG. 2, includes multiple queues for each egress pipeline 805, and a scheduler for each set of queues (i.e., for each egress pipeline). FIG. 8 illustrates the set of N queues 810 for the egress pipeline 805b, and a scheduler 815 for these queues.

As illustrated in the figure, the queues 810 have released a packet 820 to the egress pipeline 805b, based on a decision by the scheduler 815 to schedule the particular queue in which the packet was stored. The packet header vector includes the packet header fields as well as queue statistics 825 in some embodiments. These queue statistics, as mentioned, may include the queue depth and latency in some embodiments.

At one of the match-action stages 830 of the egress pipeline 805b, the match-action circuitry analyzes the queue statistics (and, in some embodiments, stored queue statistics for the other queues 810) and makes a determination to modify the queue settings for one of the queues associated with the egress pipeline 805b. This may be the same queue from which the packet 820 is released, or a different one of the queues 810. In some embodiments, the match-action stage 830 includes a stateful processor and stateful table, and uses stateful data regarding the various queues 810 to determine when queue scheduler settings should be modified.

The match-action stage 830 populates a packet header vector container with queue modification instructions 835 based on this decision. These instructions identify the port and queue identifiers (in some embodiments, the port identifier must specify one of the ports with which the egress pipeline 805b is associated), and specify the modification instructions (e.g., adjusting the rate shaper bucket for the specified queue, turning on or off scheduling for the specified queue). In some embodiments, the packet header vector still carries the queue statistics as well, as this information is not discarded until the end of the pipeline.

Upon the packet 820 reaching the end of the match-action processing portion of the egress pipeline 805b, the deparser of the pipeline reconstructs the packet using the resultant (possibly modified) packet header vector and sends the packet to the interface of the forwarding element for transmission. In some embodiments, in addition to reconstructing the packet, the egress pipeline deparser identifies specific data in the packet header vector (e.g., specific data containers) that do not actually store packet header information, and performs any necessary operations. Thus, for example, the queue setting modification instructions 835 are not part of the reconstructed packet header, and this information is instead provided to the traffic manager scheduler.

As shown in the figure, after the ingress pipeline 805b, the packet 820 is transmitted (e.g., out into the network via the forwarding element physical interface). The queue setting modification instructions, however, are sent back to the traffic manager 800 along with a byte-adjust transmission 840. As mentioned, in some embodiments, an egress pipeline may only modify the settings for queues associated with that egress pipeline, and thus the queue settings modification instructions are sent to the scheduler 815 for the set of queues 810. The scheduler 815 therefore adjusts its scheduling bucket for the queue specified by the queue identifier in the data 835. As with the ingress pipeline, in some embodiments, if the egress pipeline deparser drops the packet, the queue settings modification instructions will not be passed to the traffic manager.

In the examples shown in the figures and described above, the queues assigned to a particular egress pipeline are shown as feeding directly into that pipeline (i.e., the scheduler chooses among a flat set of ports. However, in some embodiments, the scheduler is hierarchically arranged, in that it uses a configurable hierarchical mapping of physical queues to ports. In some embodiments, one or more layers of logical queues are defined between a set of physical queues associated with a pipeline (e.g., an egress pipeline) and the ports associated with that pipeline.

Figure 9:
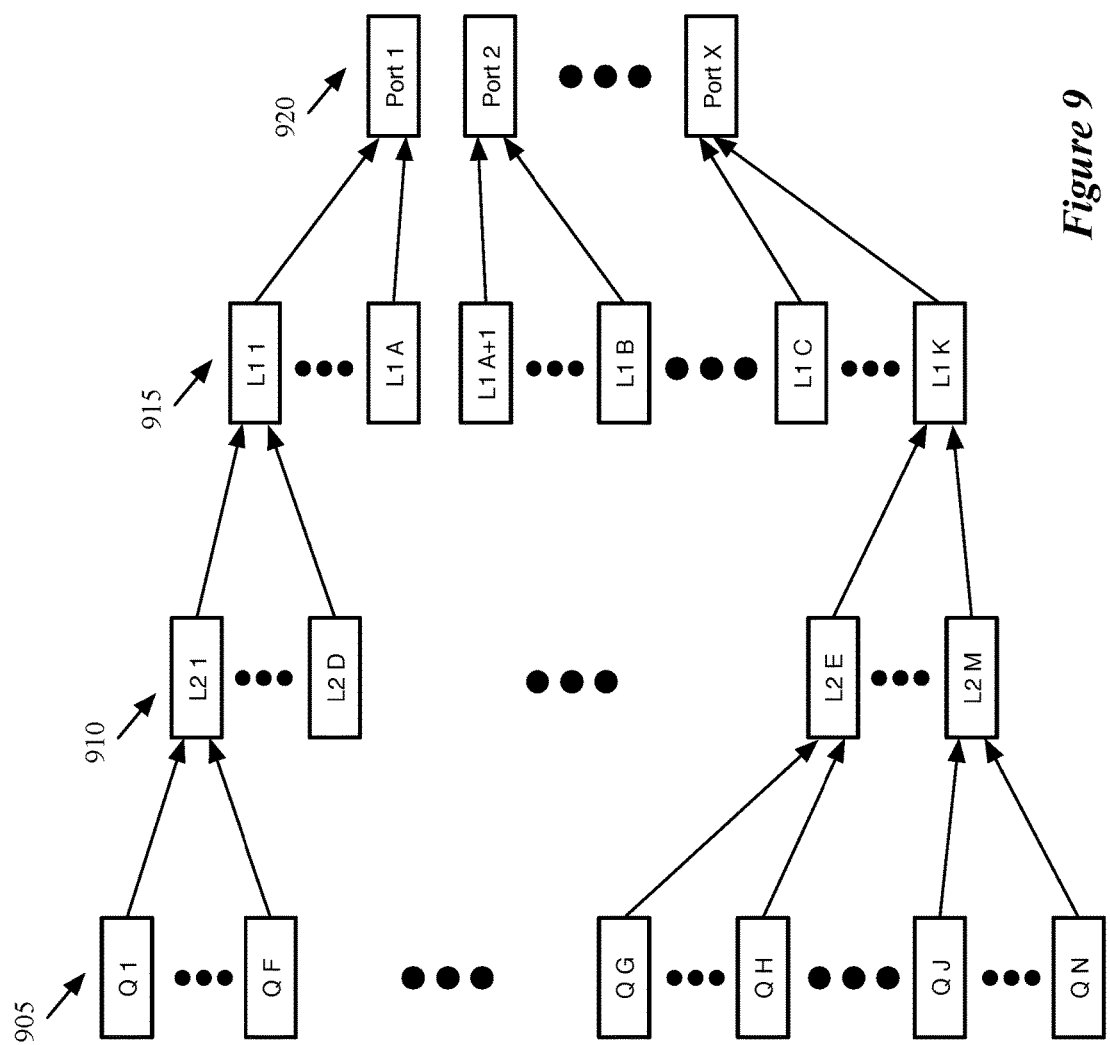
FIG. 9 conceptually illustrates a hierarchical set of queues of some embodiments.

FIG. 9 conceptually illustrates such a hierarchical set of queues 900 of some embodiments. As shown, this example has a layer 905 of physical queues, two layers 910 and 915 of logical queues, and a layer 920 of ports. These represent nodes stored by the scheduler, for which the scheduler stores various configurable and stateful properties (e.g., maximum and minimum rates, priorities, current transmission rates, etc.) In general, the number of queues becomes less at each subsequent layer from the physical queues to the ports (e.g., 128 physical queues, 64 second-layer logical queues, 16 first-layer logical queues, and 8 ports). In this example, the set of queues 900 includes N physical queues, M layer 2 (L2) logical queues, K layer 1 (L1) logical queues, and X ports (with N>M>K>X). A specific configuration for the hierarchical scheduler maps each physical queue to one top-layer logical queue, each top-layer logical queue to one logical queue at the next layer, and each last-layer logical queue to one port. Thus, the number of nodes decreases at each subsequent layer, at least one of the ports is mapped to multiple last-layer logical queues, at least one of the top-layer logical queues is mapped to multiple physical queues, etc.

As shown, for each of the ports 920, the set of queues 900 includes a set of L1 logical queues that map to the port. For example, logical queues $L1_1$-$L1_A$ map to port 1, logical queues $L1_{A+1}$-$L1_B$ map to port 2, and so on, until logical queues $L1_C$-$L1_K$ map to port X. At the next layer, a set of L2 logical queues maps to each L1 logical queue (e.g., queues $L2_1$-$L2_D$ map to queue $L1_1$, and so on. Lastly, a set of physical queues maps to each of the L2 logical queues. In some embodiments, the hardware forwarding element includes a fixed number of nodes for each layer that the administrator may configure, but the number actually used and the mapping between these queues is up to the configuration. That is, different numbers of physical queues may map to different L2 logical queues, and so on through the hierarchy.

Figure 10:
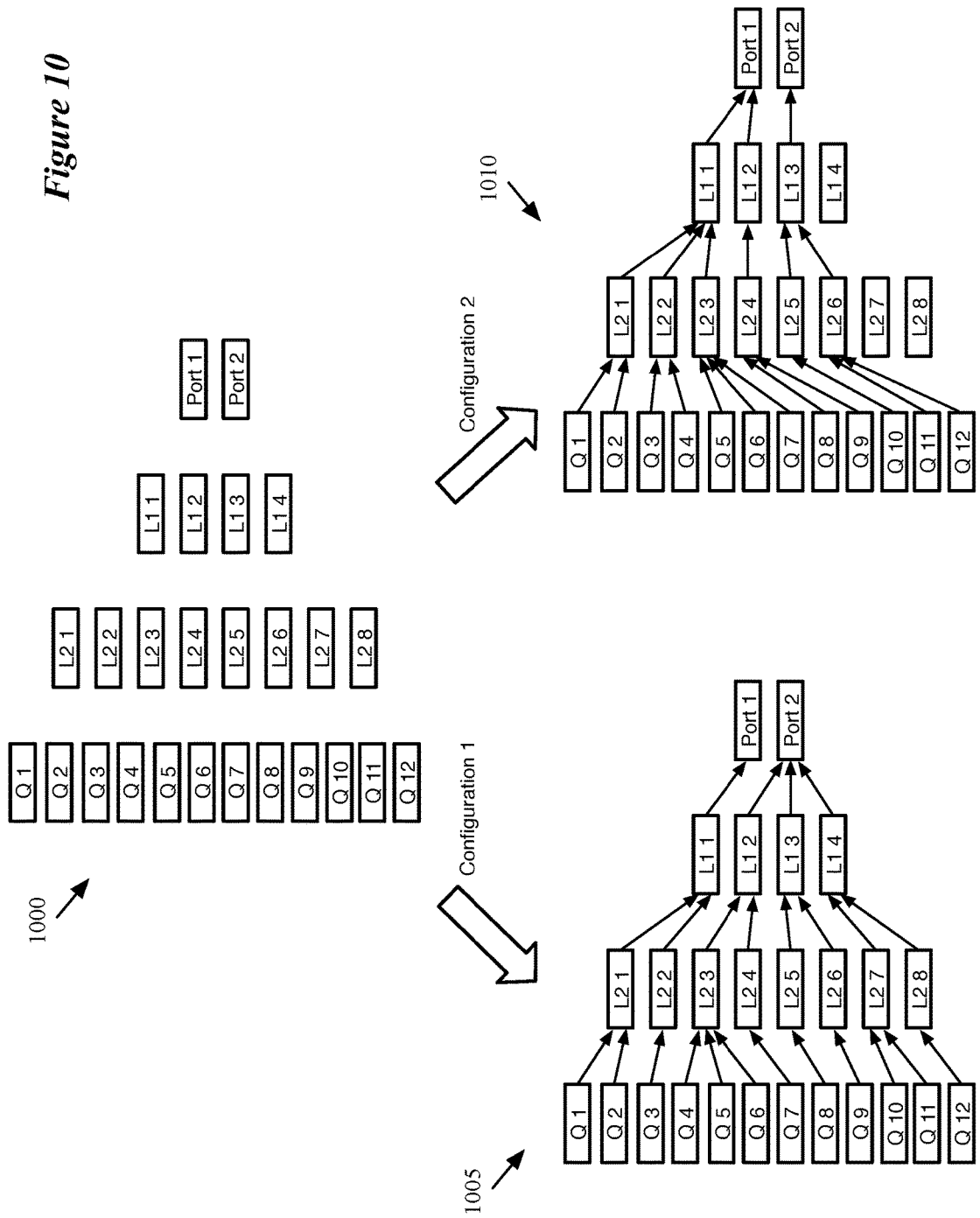
FIG. 10 conceptually illustrates two different mapping configurations for a hierarchical queue arrangement of some embodiments.

FIG. 10 conceptually illustrates how a sample hierarchical queue arrangement may be configured differently. This figure illustrates two different mapping configurations 1005 and 1010 for a hierarchical queue arrangement 1000. In this simplistic example, the hierarchical queue arrangement 1000 includes two ports, four L1 logical queues, eight L2 logical queues, and twelve physical queues. It should be understood that this is merely an example, and a typical hardware forwarding element will include a larger configurable set of queue nodes for each of its egress pipelines.

The figure illustrates two different configurations 1005 and 1010 which provide different mappings of the physical queues to L2 logical queues to L1 logical queues to ports. In both configurations 1005 and 1010, each of the physical queues maps to a single L2 logical queue, each of the L2 logical queues (to which at least one physical queue is mapped) maps to a single L1 logical queue, and each L1 logical queue (to which at least one L2 logical queue is mapped) maps to a single port. In the first configuration 1005, each of the logical queue nodes is used, and each L2 logical queue has from 1-3 physical queues mapped to it, each of the L1 logical queues has exactly two L2 logical queues mapped to it, and each of the ports is used. On the other hand, the second configuration 1010 illustrates that not all of the logical queue nodes are required to be used in a given configuration. In some embodiments, the administrator that determines the queue mapping may determine that fewer queue aggregation points are required, and map more physical queues per utilized logical queue node.

The different configurations 1005 and 1010 could represent different configurations of different forwarding elements, or different configurations used for different sets of queues on the same forwarding element (e.g., two sets of queues associated with two different egress pipelines). The different configurations allow an administrator to define different aggregation points for the physical queues. In some embodiments, the different physical queues might represent different types of traffic (e.g., standard web traffic vs. streaming video), different users (e.g., different subscribers to an Internet Service Provider), combinations thereof, etc. The logical queues allow the forwarding element to logically group these different physical queues in terms of differentiating service. For example, the administrator might want to aggregate all of the individual users into one logical queue with a lower priority, while providing each business user with a separate higher-priority logical queue. Similarly, the administrator could provide different rate guarantees for certain types of traffic (e.g., streaming video and static web pages).

Figure 11:
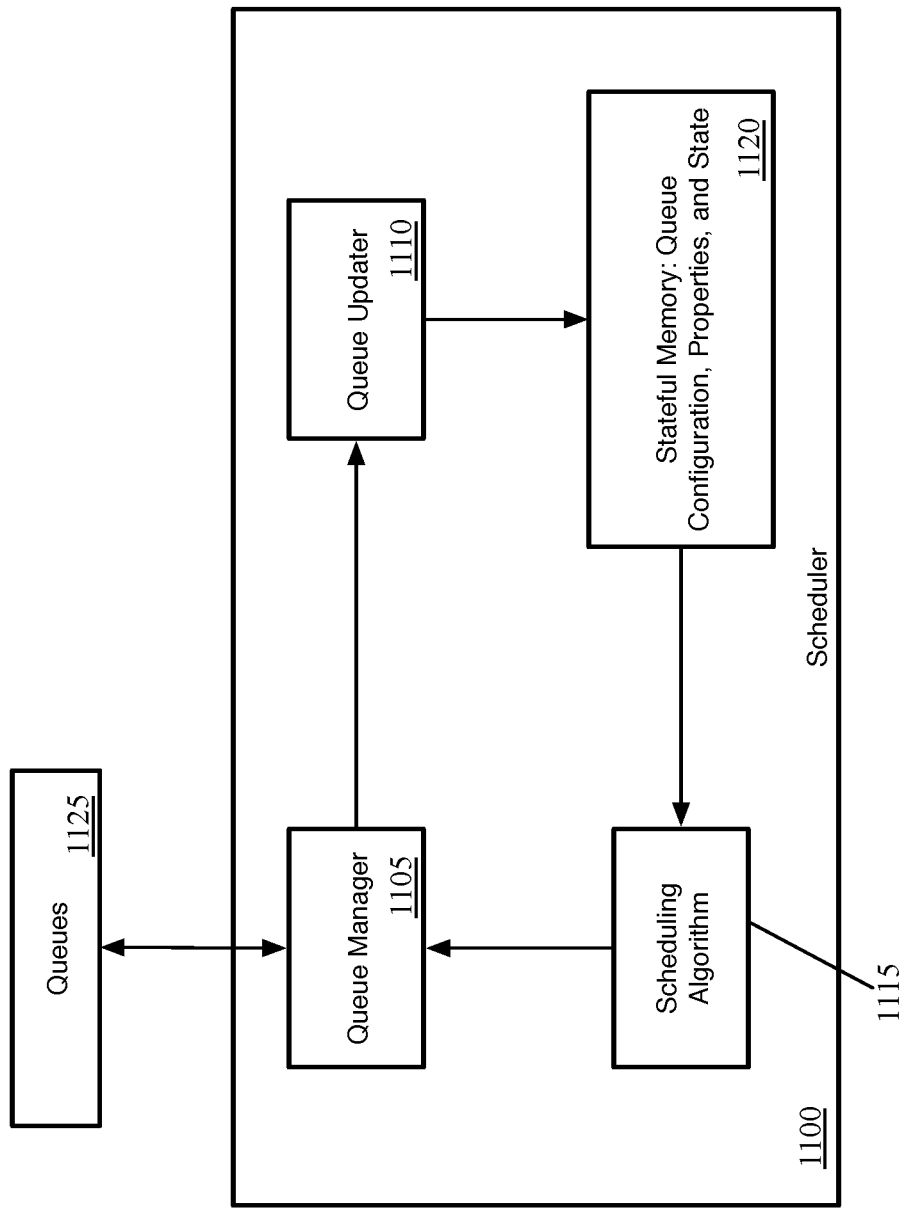
FIG. 11 conceptually illustrates the architecture of a scheduler of some embodiments.

FIG. 11 conceptually illustrates the architecture of a scheduler 1100 of some embodiments. In some embodiments, the scheduler 1100 performs the scheduling for one set of queues (i.e., that feed into a single egress pipeline), while in other embodiments the scheduler block of the hardware forwarding element independently performs scheduling for each different egress pipeline of the forwarding element. As shown, the scheduler unit 1100 includes a queue manager 1105, a queue updater 1110, a scheduling algorithm 1115 (or algorithms), and a stateful memory 1120. Each of these blocks various hardware constructions, which may be at least partly configurable.

The queue manager 1105 receives messages regarding the enqueuing and dequeuing of packets in the physical queues 1125, and instructs the queues 1125 when to dequeue packets based on the scheduler results. The queue updater 1110 modifies the (physical and logical) queue state 1120 based on the enqueuing and dequeuing of packets (e.g., to update occupancy and priority information), as described below by reference to FIG. 12. The scheduling algorithm(s) 1215 uses the queue state 1120 to schedule dequeuing of packets, as described below by reference to FIGS. 13 and 14.

The stateful memory 1120 of some embodiments stores the queue configuration information as well as the queue state. It should be understood that some embodiments store the configuration (which does not need to be updated during runtime) in one memory and store the regularly changing queue state in a separate stateful memory; for simplicity, all of this information is combined here. In some embodiments, the queue configuration includes the mapping of physical queues to ports through one or more layers of logical queues (e.g., as shown above in FIG. 10), as well as the physical queue priorities (and static logical queue priorities), minimum (guaranteed) and maximum transmission rates for each physical and logical queue, and round-robin weights. The stateful information includes the recent queue usage (e.g., for round-robin determination), current transmission rates for each physical and logical queue, xoff state (i.e., whether scheduling has been turned off for a particular queue), and queue occupancy.

Figure 12:
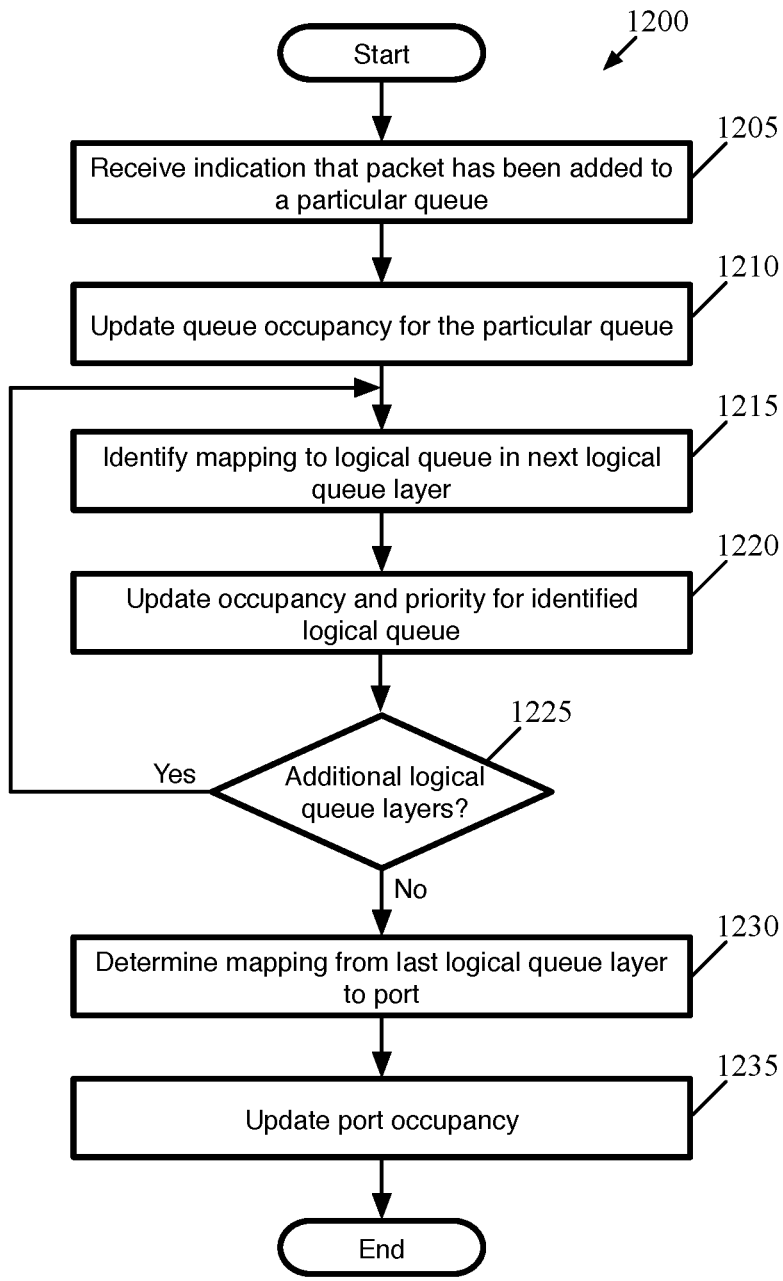
FIG. 12 conceptually illustrates a process performed by the scheduler to update queue state when a packet is added to a physical queue.

FIG. 12 conceptually illustrates a process 1200 performed by the scheduler to update queue state when a packet is added to a physical queue. In some embodiments, a specific unit of the scheduler, such as the queue updater 1110, performs this process 1200 or a similar process. As shown, the process 1200 begins by receiving (at 1205) an indication that a packet has been added to a particular queue. When a packet is received by the traffic manager, the traffic manager of some embodiments adds the packet to a physical queue (according to packet properties, such as its source and destination addresses, etc.) and notifies the scheduler of the addition of the packet to this queue (e.g., by sending a message to the queue manager 1105).

The process then updates (at 1210) the queue occupancy state for the particular queue to which the packet was added. The scheduler, in some embodiments, stores state data for each physical queue node, logical queue node, and port node in its hierarchical configuration. For the particular physical queue, the scheduler stores the existence of the packet in the queue (and the size of the packet, in some embodiments, if transmission rates are tracked in bits per second rather than packets per second).

In addition, based on the hierarchical queue configuration, the scheduler updates the state of the logical queue nodes at each logical queue layer to account for the addition of the packet, as well as the node for the corresponding port to which the physical queue of the packet maps through the logical queue layers. As shown, the process 1200 next identifies (at 1215) a mapping to a logical queue in the next logical queue layer. This process assumes that the hierarchical scheduler has at least one logical queue layer. The first time through operation 1215, the scheduler uses its stored configuration to map the physical queue to a top-layer logical queue. For example, referring to configuration 1005 of FIG. 10, if a packet was received at physical queue $Q_7$, the scheduler would map this packet to logical queue node $L2_4$.

The process also updates (at 1220) the occupancy and priority information for the identified logical queue. If the logical queue node did not previously have any enqueued packets, then it will now be occupied. If the logical queue node previously had one or more existing packets in its queue, this occupancy is incremented.

When updating the logical queue nodes, some embodiments also update the priority of the logical queue nodes. In some embodiments, the configuration for the scheduler assigns a priority to each physical queue. The logical queue nodes can have priorities assigned dynamically or statically in different embodiments (or a combination thereof). A logical queue node with a static assignment has its priority assigned by the configuration, which does not change. However, other logical queue nodes may have priorities propagated from the previous layer of nodes. In some such embodiments, a logical queue node has the priority of its highest-priority queue node at the previous layer that is eligible and non-empty.

For example, in configuration 1005, if physical queues $Q_1$-$Q_8$ have priorities 1-8 respectively (with priority 8 being the highest, then a first packet received at physical queue $Q_4$ will mean that logical queue node $L2_3$ is assigned a priority of 4. However, if the next packet (received prior to the first packet being dequeued from queue $Q_4$) is received at physical queue $Q_6$, then the scheduler will update the priority of the logical queue node $L2_3$ to be priority 6. If this second packet is then dequeued (without the receipt of any additional packets for physical queues $Q_4$-$Q_6$), the scheduler will change the priority back to 4.

After updating the logical queue node for the current layer, the process 1200 determines (at 1225) whether additional logical queue layers remain. It should be understood that this is a conceptual process that represents an arbitrary number of logical queue layers. However, in some embodiments, the number of logical queue layers for a particular scheduler is fixed, and thus no determination is actually made by the scheduler as to whether additional logical layers remain. If additional logical queue layers remain, the process 1200 returns to 1215 to map to the next logical queue layer and update the occupancy of a logical queue node at that layer.

After the last logical queue layer, the process 1200 determines (at 1230) the mapping from the last logical queue layer to a port node. In the example of hierarchical configuration 1005, the packet received at physical queue $Q_7$ would be mapped to L2 logical queue $L2_4$, L1 logical queue $L1_2$, and finally to port 2. In addition, the process updates (at 1235) the port occupancy, similar to the occupancy updates described above for the other layers. In some embodiments, the scheduler does not store priority information for ports, though other embodiments also update this priority information in the same manner as the queues. The process then ends.

Figure 13:
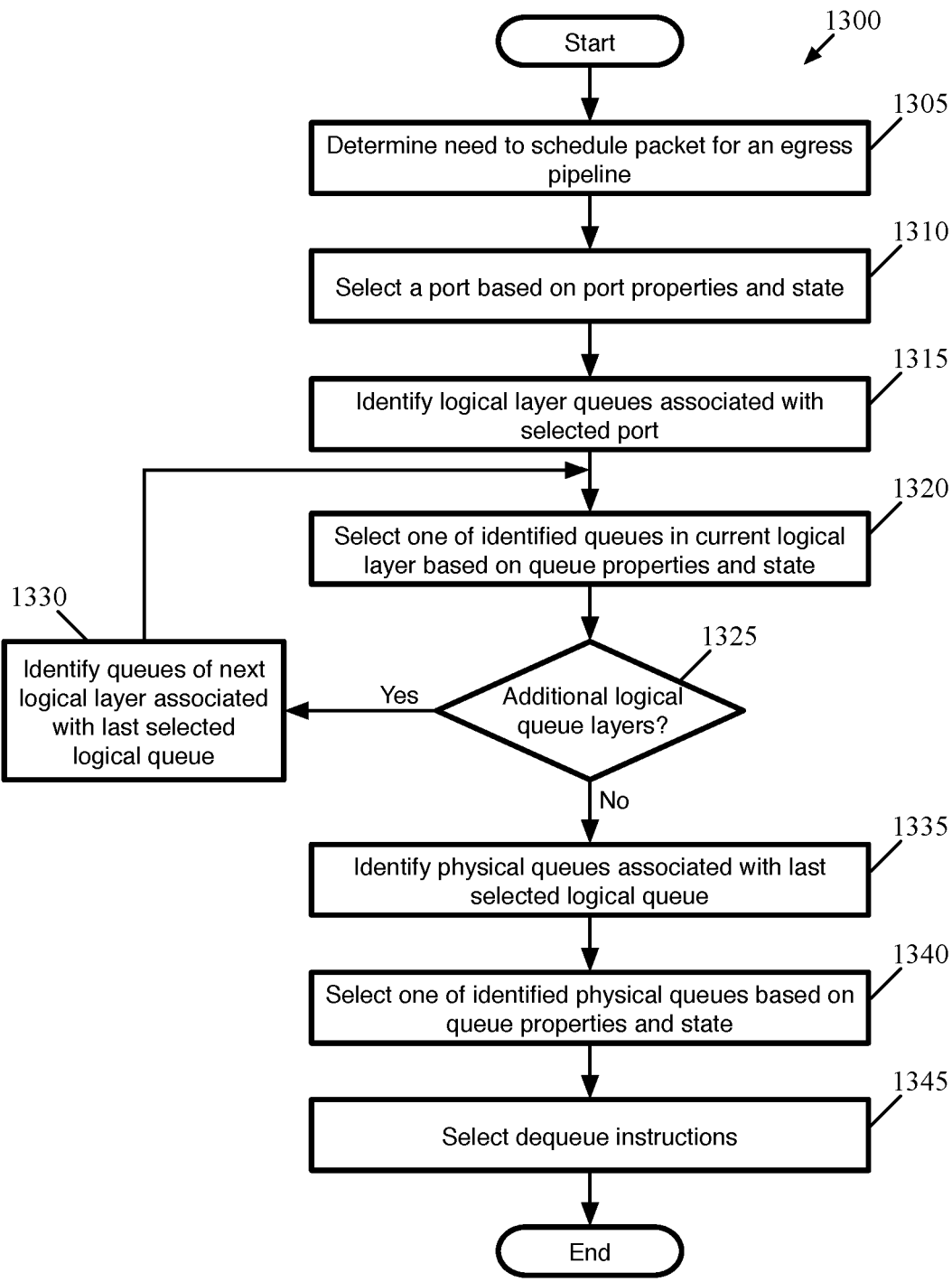
FIG. 13 conceptually illustrates a process performed by the scheduler of some embodiments to schedule a packet for dequeuing.

While FIG. 12 illustrates the process of enqueuing a packet, FIG. 13 conceptually illustrates a process 1300 performed by the scheduler of some embodiments to schedule a packet for dequeuing. To schedule a packet for dequeuing, some embodiments proceed through the hierarchy in the opposite order of the enqueuing. That is, upon determining that a packet should be dequeued to a particular egress pipeline, some embodiments first select a port, then a lowest-layer logical queue node that maps to the selected port, then a logical queue node at the next layer, and so on, until a physical queue is selected. In some embodiments, a specific unit of the scheduler, such as the scheduling algorithm 1115, performs this process 1300 or a similar process. As shown, the process begins by determining (at 1305) a need to schedule a packet for an egress pipeline. As mentioned, in some embodiments each egress pipeline is scheduled independently. Some embodiments schedule a packet for dequeuing each clock cycle, while other embodiments schedule a packet in response to a message or other external indicator.

The process 1300 selects (at 1305) one of the ports associated with the egress pipeline based on the port properties and state. Different embodiments may use different scheduling techniques to select among a group of eligible nodes. For instance, some embodiments select a port differently than the other queue layers. In some embodiments, the eligible ports are selected using a fair, round-robin algorithm (that is, there is no notion of priority between ports). So long as a port is turned on (i.e., scheduling has not been turned off for the port), has at least one eligible logical queue that maps to it, and has not exceeded a maximum rate (though, in some embodiments, there is no maximum rate set for ports, only for physical and logical queues), the port is eligible for scheduling and will be selected in turn with the other eligible ports.

The process 1300 then identifies (at 1315) the logical layer queue nodes (at the lowest logical queue layer) associated with the selected port. For example, by reference to the configuration 1005 of FIG. 10, if port 2 was selected at operation 1310, the process would identify the L1 queues $L1_2$-$L1_4$ as the logical queues at the next layer. The process selects (at 1315) one of the identified queues in the current logical layer based on the queue properties and state. At the queue layers, some embodiments first remove all non-eligible queue nodes, then select among the eligible queues based on the various queue properties (e.g., the minimum and maximum rates, priority, weights, past queue selection, etc.). One such algorithm is described in further detail below by reference to FIG. 14.

Next, the process 1300 determines (at 1325) whether additional logical queue layers remain. As mentioned with regard to the process 1200, it should be understood that this is a conceptual process that represents an arbitrary number of logical queue layers. However, in some embodiments, the number of logical queue layers for a particular scheduler is fixed, and thus no determination is actually made by the scheduler as to whether additional logical layers remain. If additional logical queue layers remain, the process identifies (at 1330) queues of the next logical layer that are associated with the previously selected logical queue. For example, if and L1 logical queue was selected at the last iteration of operation 1320, then the process would select one of the L2 logical queues that maps to that L1 logical queue.

Once a logical queue from the last layer of logical queues has been selected (the layer to which the physical queues directly map), the process 1300 identifies (at 1335) the physical queues associated that last selected logical queue, and selects (at 1340) one of the identified physical queues based on the queue properties and state. In some embodiments, the queue selection operates in the same manner as the logical queue selection described in detail below by reference to FIG. 14.

The process then sends (at 1345) dequeue instructions for the selected physical queue, and ends. In some embodiments, the dequeue instructions are sent to the queue manager 1105, or a similar unit outside of the scheduler block. The queue manager 1105 specifies for the queue to release its next packet to the egress pipeline for processing. In addition, once the packet is dequeued, the scheduler receives a message regarding this dequeuing, and performs a process similar to that shown in FIG. 12. That is, the scheduler goes through its hierarchy to update the queue occupancy and priority based on the dequeued packet. In addition, this information affects the transmission rate for the physical and logical queues stored by the scheduler, used to make the scheduling decisions in some embodiments.

As mentioned in the context of the process 1300, when selecting among a set of queue nodes at a particular queue layer, different embodiments may use different algorithms to select a queue for scheduling. In some embodiments, these selection algorithms may utilize the configuration parameters of the queue nodes (e.g., minimum (guaranteed) and maximum rates, static priorities, round-robin weights, etc.) as well as state updated during runtime of the forwarding element (e.g., current transmission rate, dynamic priorities, previous queue selections, xoff state, queue credits based on processing pipeline actions, etc.

Figure 14:
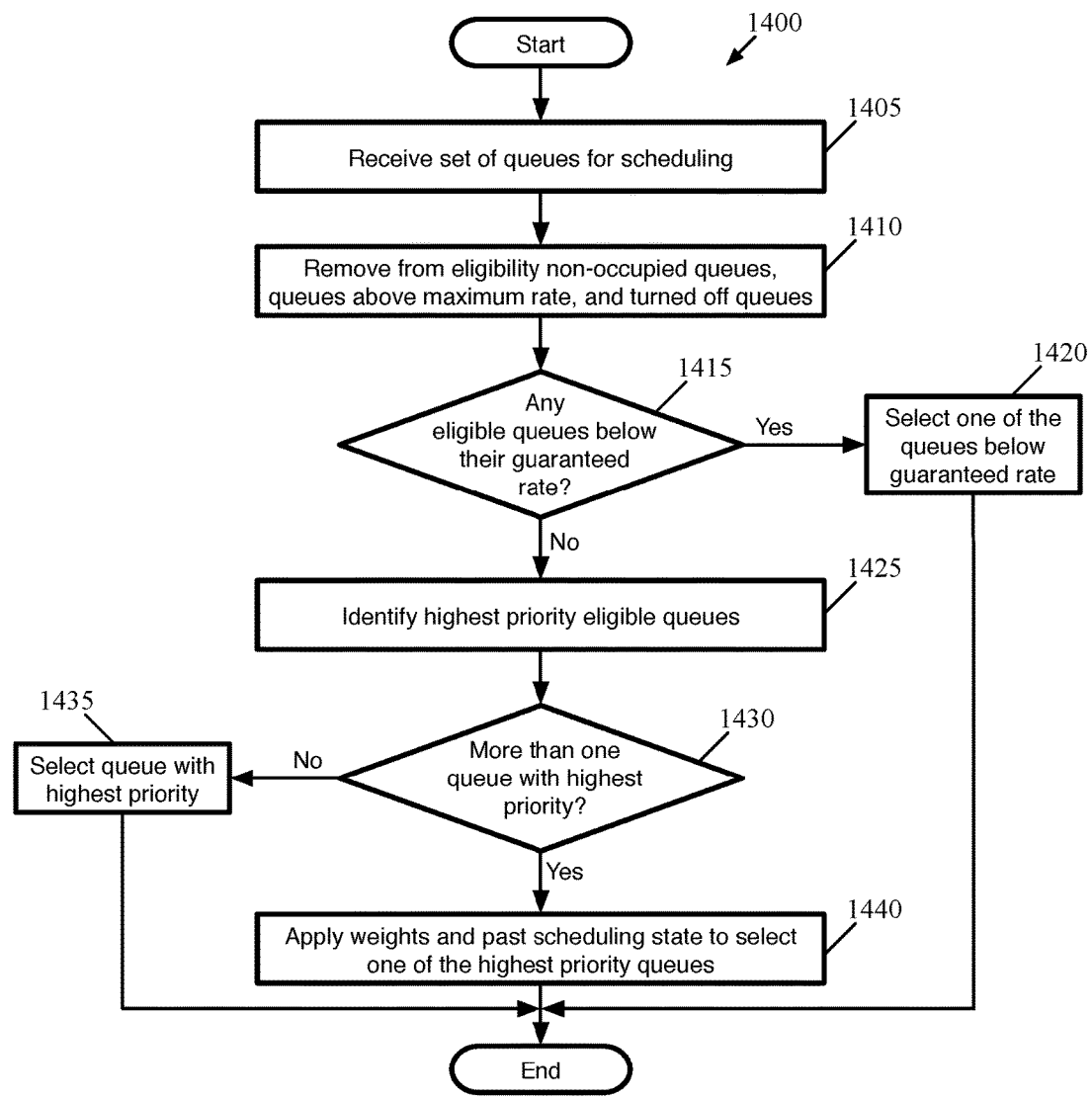
FIG. 14 conceptually illustrates a process of some embodiments for selecting a queue for scheduling among a set of queues that map to a previously-selected queue (or port) at lower level of a hierarchical scheduler.

FIG. 14 conceptually illustrates a process 1400 of some embodiments for selecting a queue for scheduling among a set of queues that map to a previously-selected queue (or port) at lower level of a hierarchical scheduler. It should be understood that the process 1400 represents one possible scheduling algorithm, and that other algorithms using the same or different queue parameters are possible in different embodiments. In some embodiments, the process 1400 is performed at operation 1320 (or operation 1340) of the process 1300.

As shown, the process 1400 begins by receiving (at 1405) a set of queues for scheduling. These may be a set of logical queues or a set of physical queues, as some embodiments use the same algorithm for each layer of queues (though some embodiments use a simple, round-robin algorithm for port selection). In some embodiments, the set of queues are those queues identified based on a selected scheduler node (i.e., a port or a logical queue) from a previous scheduler layer.

The process 1400 removes (at 1410) non-eligible queue from the set of queues from which to select. In some embodiments, these include queues that are not occupied (i.e., physical queues to which no packets are associated, or logical queues whose physical queues do not have any associated packets), queues with a transmission rate above (or at) the maximum rate, and queues that have been turned off for scheduling. A queue might be above its maximum rate because it is a high priority queue that has been scheduled repeatedly, because it recently sent out a very large packet, etc. In addition, if match-action processing specified to subtract credit for the queue node, this could result in the queue being above its current maximum rate. Similarly, if match-action processing specified to turn off scheduling for a queue, its xoff state would indicate non-eligibility. In some embodiments, the match-action processing can modify the settings of both physical queues and logical queues.

Next, the process 1400 determines (at 1415) whether any eligible queues are below their guaranteed rate. As indicated, each physical and logical queue has a minimum, or guaranteed, transmission rate. This allows an administrator to ensure that even the lowest priority queues (e.g., for static http traffic) will not be completely overshadowed by higher priority traffic. If any of the eligible queues are below their respective guaranteed rates (which may be different for different physical and logical queues), these take priority (even if the queue priority is lower than some of the other queues).

If at least one eligible queue is below its guaranteed rate, the process 1400 selects (at 1420) one of these queues. Some embodiments ignore priority at this point, and simply use a round-robin algorithm to select a queue (which relies on the state information indicating the order in which the queues have recently been selected). Other embodiments select the highest priority queue that is below its guaranteed rate, or select the queue with the greatest difference between its current transmission rate and its minimum guaranteed rate. Still other embodiments use a random selection, which may be weighted by factors such as priority, difference between minimum and current rates, etc.

If all of the eligible queues for the current layer are above their respective guaranteed minimum transmission rates, the process 1400 identifies (at 1425) the highest priority eligible queues. As described above, the physical queues have priorities configured, and logical queues can either have statically configured priorities or inherit the priorities of their occupied higher-level queues (either logical or physical).

The process 1400 also determines (at 1430) whether there is more than one eligible queue with this highest priority (i.e., whether there is a tie). If there is one eligible queue with the highest priority, then the process selects (at 1435) this queue for scheduling. On the other hand, when there is more than one such queue, the process applies (at 1440) weights and past scheduling state to select one of these highest-priority queues. Some embodiments use a fair scheduling round-robin algorithm to rotate between queues of the same priority, and the past scheduling state is used to identify which queue should be scheduled next. In addition, some embodiments allow the administrator to configure weights for the queues that affect the round-robin scheduling. For example, a queue with weight 1 would be scheduled once per round, while a queue with weight 2 would be scheduled twice per round. Thus, if these are the only two queues being scheduled, over six selections the second queue would be selected four times and the first queue twice. After selecting a queue, the process 1400 ends.

Figure 15:
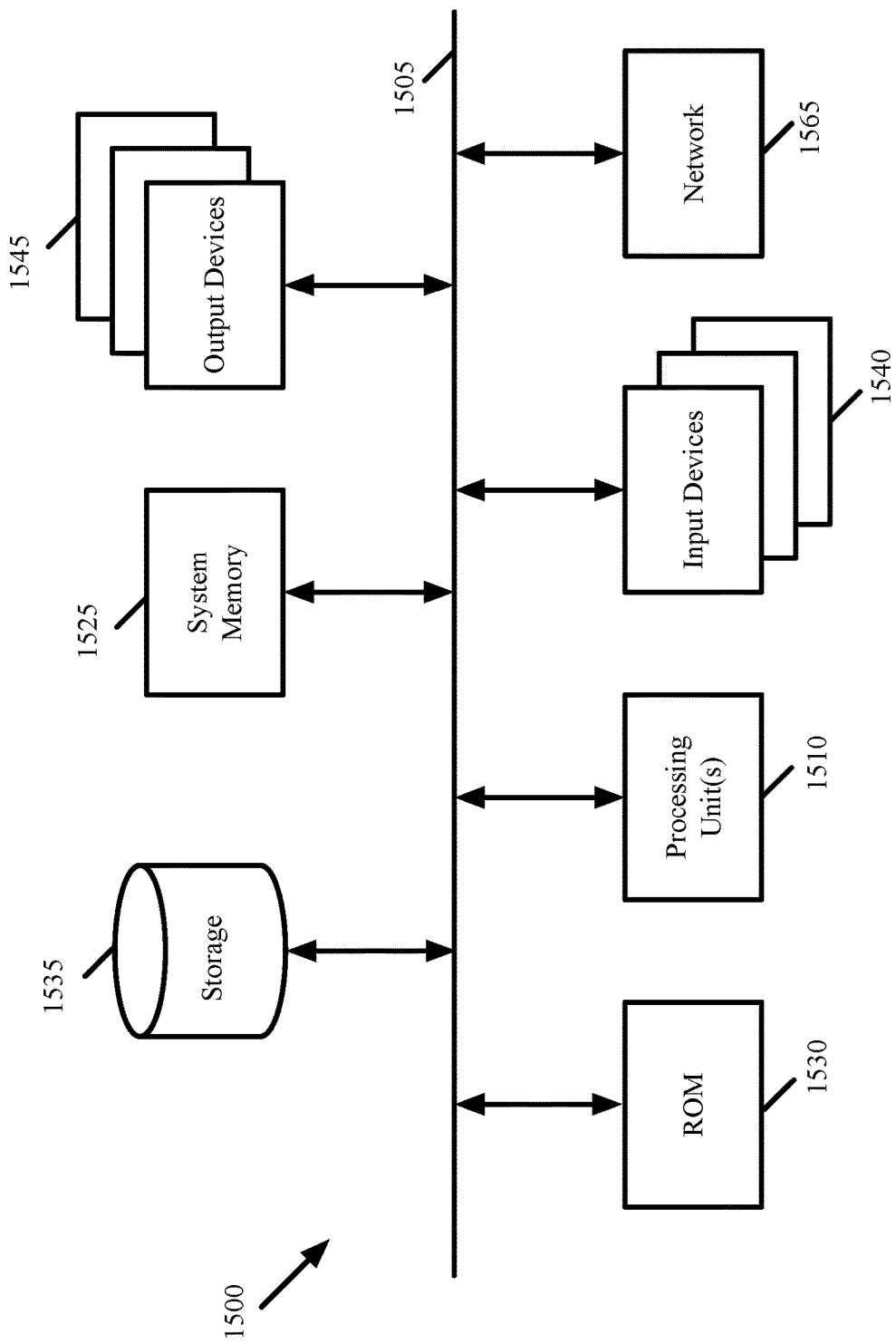
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 7, and 12-14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for scheduling a packet to be dequeued to a processing pipeline of a hardware forwarding element, the method comprising:

selecting a port node representing one of a plurality of ports associated with the processing pipeline;

identifying, based on a configuration that maps (i) each of a plurality of physical queues to one second-layer logical queue, (ii) each second-layer logical queue to one first-layer logical queue, and (iii) each first-layer logical queue to one of the plurality of ports, a set of first-layer logical queue nodes associated with the selected port node;

selecting one of the identified first-layer logical queue nodes based on properties of the identified first-layer logical queue nodes;

identifying, based on the configuration, a set of second-layer logical queue nodes associated with the selected first-layer logical queue node;
selecting one of the identified second-layer logical queue nodes based on properties of the identified second-layer logical queue nodes;
selecting one of a set of physical queues associated with the selected second-layer logical queue node; and
dequeuing a packet from the selected physical queue for processing by the processing pipeline.

2. The method of claim 1, wherein (i) at least one of the second-layer logical queues is mapped to multiple physical queues, (ii) at least one of the first-layer logical queues is mapped to multiple second-layer logical queues, and (iii) at least one of the ports is mapped to multiple first-layer logical queues.

3. The method of claim 1, wherein selecting a port node representing one of the ports comprises:
identifying a set of eligible ports; and
using a round robin mechanism to select one of the eligible ports.

4. The method of claim 3, wherein a particular port is eligible when at least one packet is associated to a physical queue that maps to the particular port through the first and second layers of logical queues.

5. The method of claim 3, wherein all of the ports are given equal priority for selection when eligible.

6. The method of claim 1, wherein selecting one of a set of identified logical queue nodes of a particular layer comprises:
removing from the set any logical queue nodes that are ineligible;
determining whether any eligible queues are below their respective guaranteed transmission rates; and
when at least one eligible queue is below its guaranteed transmission rate, selecting one of said queues.

7. The method of claim 6, wherein a particular logical queue node is ineligible when scheduling has been turned off for the particular logical queue node.

8. The method of claim 6, wherein a particular logical queue node is ineligible when the particular logical queue node has exceeded a maximum rate for the particular logical queue node.

9. The method of claim 6, wherein a particular logical queue node is ineligible when the particular logical queue node does not have any packets assigned.

10. The method of claim 6, wherein selecting one of the set of identified logical queue nodes of a particular layer further comprises:
when all of the eligible queues are above their respective guaranteed transmission rates, identifying a subset of the logical queue nodes with a highest priority; and
selecting one of the subset of logical queue nodes with the highest priority.

11. A method for scheduling a packet to be dequeued to a processing pipeline of a hardware forwarding element, the method comprising:
selecting a port node representing one of a plurality of ports associated with the processing pipeline;
for each of one or more layers of logical queues:
identifying, based on a configuration that maps a plurality of physical queues to the plurality of ports via the one or more layers of logical queues, a set of logical queue nodes associated with a previously selected node, wherein the previously selected node is a port node for a first layer of logical queues and a logical queue node for each subsequent layer of logical queues; and
selecting one of the identified logical queue nodes based on properties of the identified logical queue nodes;
selecting one of a set of physical queues associated with a selected logical queue node of the last layer of logical queues;
dequeuing a packet from the selected physical queue for processing by the processing pipeline;
receiving a message that a new packet has been added to a particular physical queue; and
updating state for the particular physical queue.

12. The method of claim 11, wherein the layers of logical queues comprise a first layer of logical queues and a second layer of logical queues, wherein the configuration maps (i) each physical queue to one second-layer logical queue, (ii) each second-layer logical queue to one first-layer logical queue, and (iii) each first-layer logical queue to one of the plurality of ports.

13. The method of claim 11, wherein dequeuing the packet comprises sending a message to a queue manager to dequeue the packet from the selected physical queue.

14. The method of claim 13 further comprising:
receiving a message that a particular packet has been dequeued from the selected physical queue; and
updating state for the selected physical queue and the logical queue nodes at each layer to which the selected physical queue maps.

15. The method of claim 11 further comprising:
mapping the particular physical queue to a particular logical queue node at a first layer of logical queues; and
updating state for the particular logical queue node of the first layer of logical queues.

16. The method of claim 15 further comprising, for each subsequent layer of logical queues:
mapping the particular logical queue node of the previous layer of logical queues to a particular logical queue node of the current layer of logical queues; and
updating state for the particular logical queue node of the current layer of logical queues.

17. A network forwarding integrated circuit (IC) comprising:
a packet processing pipeline;
a plurality of ports associated with the packet processing pipeline; and
a traffic management unit comprising a set of physical queues and a scheduler, the scheduler configured to:
select a port node representing one of the ports;
identify, based on a configuration that maps (i) each of a plurality of physical queues to one second-layer logical queue, (ii) each second-layer logical queue to one first-layer logical queue, and (iii) each first-layer logical queue to one of the plurality of ports, a set of first-layer logical queue nodes associated with the selected port node;
select one of the identified first-layer logical queue nodes based on properties of the identified first-layer logical queue nodes;
identify, based on the configuration, a set of second-layer logical queue nodes associated with the selected first-layer logical queue node;
select one of the identified second-layer logical queue nodes based on properties of the identified second-layer logical queue nodes;

select one of a set of physical queues associated with the selected second-layer logical queue node; and dequeue a packet from the selected physical queue for processing by the processing pipeline.

18. The network forwarding IC of claim 17, wherein the scheduler is configured to select a port node representing one of the ports by identifying a set of eligible ports and using a round robin mechanism to select one of the eligible ports.

19. The network forwarding IC of claim 17, wherein the scheduler is configured to select one of a set of identified logical queue nodes for a particular layer by (i) removing from the set any logical queue nodes that are ineligible, (ii) determining whether any eligible queues are below their respective guaranteed transmission rates, and (iii) when at least one eligible queue is below its guaranteed transmission rate, selecting one of said queues.

20. The network forwarding IC of claim 17, wherein (i) at least one of the second-layer logical queues is mapped to multiple physical queues, (ii) at least one of the first-layer logical queues is mapped to multiple second-layer logical queues, and (iii) at least one of the ports is mapped to multiple first-layer logical queues.

* * * * *